(12) United States Patent
Nakamura et al.

(10) Patent No.: US 8,266,176 B2
(45) Date of Patent: Sep. 11, 2012

(54) STORAGE SYSTEM AND FILE ACCESS DETERMINATION METHOD OF THE SAME

(75) Inventors: Takaki Nakamura, Ebina (JP); Hitoshi Kamei, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 105 days.

(21) Appl. No.: 12/811,997

(22) PCT Filed: Mar. 12, 2010

(86) PCT No.: PCT/JP2010/001779
§ 371 (c)(1),
(2), (4) Date: Jul. 7, 2010

(87) PCT Pub. No.: WO2011/111115
PCT Pub. Date: Sep. 15, 2011

(65) Prior Publication Data
US 2012/0030242 A1 Feb. 2, 2012

(51) Int. Cl.
*G06F 17/30* (2006.01)
(52) U.S. Cl. .......................... 707/781; 713/165; 713/193
(58) Field of Classification Search ............... 707/781
See application file for complete search history.

(56) References Cited

U.S. PATENT DOCUMENTS

| | | | | |
|---|---|---|---|---|
| 5,566,326 A * | 10/1996 | Hirsch et al. | | 703/26 |
| 6,032,216 A * | 2/2000 | Schmuck et al. | | 710/200 |
| 2001/0039622 A1* | 11/2001 | Hitz et al. | | 713/201 |
| 2002/0089551 A1* | 7/2002 | Hugh et al. | | 345/853 |
| 2008/0040538 A1* | 2/2008 | Matsuzawa et al. | | 711/113 |
| 2008/0244738 A1* | 10/2008 | Shiozawa et al. | | 726/21 |
| 2009/0077087 A1 | 3/2009 | Urano et al. | | |
| 2009/0271412 A1* | 10/2009 | Lacapra et al. | | 707/10 |

FOREIGN PATENT DOCUMENTS

| | | |
|---|---|---|
| JP | 2002-506248 | 2/2002 |
| JP | 2009-75672 | 4/2009 |
| JP | 2009-211668 | 9/2009 |

OTHER PUBLICATIONS

PCT International Search Report and Written Opinion on application No. PCT/JP2010/001779 dated Dec. 7, 2010; 10 pages.
Grünbacher, Andreas; POSIX Access Control Lists on Linux; Proceedings of the FREENIX Track: 2003 USENIX Annual Technical Conference, Jun. 9-14, 2003; pp. 259-272.

* cited by examiner

*Primary Examiner* — Shyue Jiunn Hwa
(74) *Attorney, Agent, or Firm* — Foley & Lardner LLP

(57) ABSTRACT

A storage system configured to be applied to a broad range of access forms to the file and improve performance of file access control processing. The storage system may store a part of the access control information of a variable size in the basic attribute area of the file, and store the storage format information in the basic attribute area of the file or in the file system metadata area. At the time of processing the access to the file, with reference to the storage format information, the storage system may decode a part of the access control information into an access mask bit string as needed, and perform the preceding access control processing.

12 Claims, 23 Drawing Sheets

FIG. 6

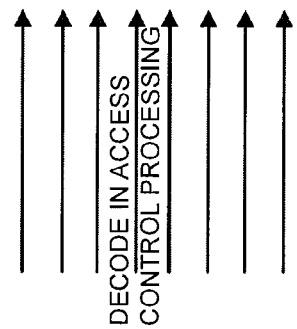

| # | ACE mask | 1 WRITE_OWNER | 2 WRITE_DAC | 3 READ_CONTROL | 4 DELETE | 5 FILE_WRITE_ATTRIBUTE | 6 FILE_READ_ATTRIBUTE | 7 FILE_DELETE_CHILD | 8 FILE_EXECUTE | 9 FILE_WRITE_EA | 10 FILE_READ_EA | 11 FILE_APPEND_DATA | 12 FILE_WRITE_DATA | 13 FILE_READ_DATA | 14 SYNCHRONIZE |
|---|---|---|---|---|---|---|---|---|---|---|---|---|---|---|---|
| | | ○ | ○ | ○ | ○ | ○ | ○ | ○ | ○ | ○ | ○ | ○ | ○ | ○ | ○ |
| | | × | × | ○ | ○ | ○ | ○ | × | ○ | ○ | ○ | ○ | ○ | ○ | ○ |
| | | × | × | ○ | × | × | ○ | × | ○ | × | ○ | × | × | ○ | ○ |
| | | × | × | ○ | × | × | ○ | × | × | × | ○ | × | × | ○ | ○ |
| | | × | × | ○ | × | ○ | ○ | × | × | ○ | ○ | ○ | ○ | × | ○ |
| | | | | | | | | | | | | | | | |
| | | | | | | | | | | | | | | | |
| | | U | U | U | U | U | U | U | U | U | U | U | U | U | U |

LEGENDS: ○ PERMITTED,
× NOT PERMITTED, U NOT DETERMINED

STORE THIS NUMBER AS ACCESS RIGHT INFORMATION →

| SETTING PATTERN | VALUE |
|---|---|
| CIFS: FULL CONTROL | 1 |
| CIFS: CHANGE | 2 |
| CIFS: READ AND EXECUTE | 3 |
| CIFS: READ | 4 |
| CIFS: WRITE | 5 |
| UNUSED 1 | 6 |
| UNUSED 2 | 7 |
| OTHERS (NOT DETERMINED) | 0 |

DECODE IN ACCESS CONTROL PROCESSING

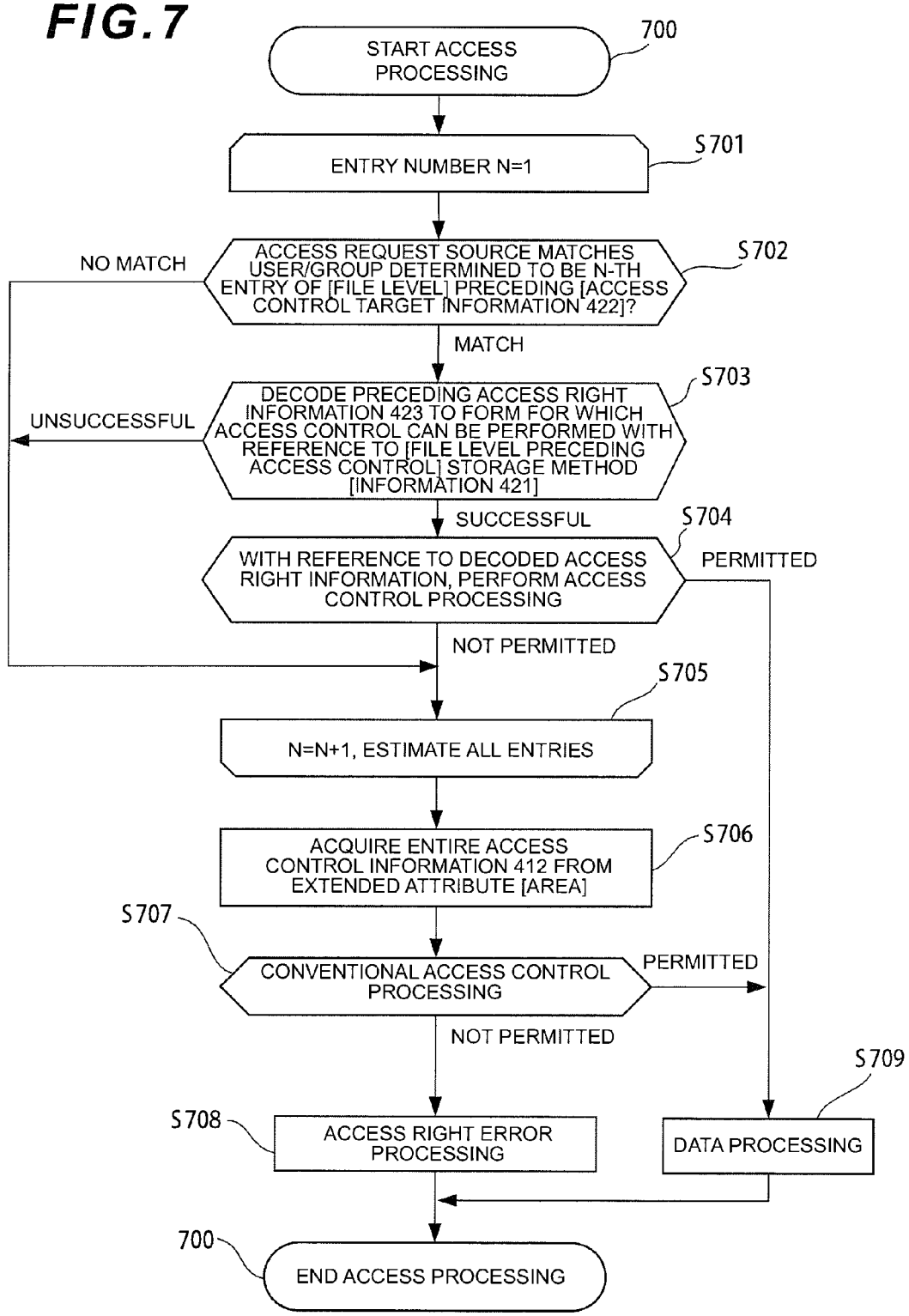

FIG. 9

FILE SYSTEM CREATION

BASIC PARAMETER

FILE SYSTEM NAME: fs1

FILE SYSTEM SIZE: 100 GB

TUNING PARAMETER

PRECEDING ACCESS CONTROL INFORMATION

--- FIRST ENTRY ---

STORAGE METHOD: S

TARGET:
- ○ OWNER
- ○ OWNER GROUP
- ○ OTHERS (NFS: OTHERS, CIFS: EVERYONE)
- ○ SPECIFIED USER
- ⊙ SPECIFIED GROUP  group1

PREFERENTIAL STORAGE INFORMATION (UP TO 7 TYPES):
CIFS: FULL CONTROL
CIFS: CHANGE
CIFS: READ AND EXECUTE
CIFS: READ
CIFS: WRITE
NFS: rwx
NFS: rw-
NFS: r-x
NFS: r--
OTHER PATTERN

→
←

1 CIFS: FULL CONTROL
2 NFS: rw-
3 OTHER 1 (NFS: --x)

--- N-TH ENTRY ---
SAME AS FIRST ENTRY

DEFAULT PRECEDING ACCESS CONTROL INFORMATION AT TIME OF FILE CREATION
- ⊙ FILE SYSTEM SETTING VALUE
- ○ INHERIT SETTING INFORMATION OF PARENT DIRECTORY

STORAGE SYSTEM AND FILE ACCESS DETERMINATION METHOD OF THE SAME

TECHNICAL FIELD

This invention relates to a storage system controlling file access and a file access determination method of the same.

BACKGROUND ART

Generally, if a user accesses a file system object in a file system, the file system program performs the access control processing for determining whether the user is permitted to access the file system object or not. At this point, the file system object refers to a file, a directory, a folder, or others. Hereinafter, unless otherwise specified, the file system object is abbreviated as a "file."

The access control processing is performed in accordance with access control information. The typical types of access control information are the two described below.

(1) Permission information
(2) ACL (Access Control List)

The permission information defines access right information for three types of targets; namely, the file owner, the owner group, and other users. The access right information is configured of three types of information, the reference right information (r), the update right information (w), and the execution right information (x). Therefore, the amount of information is a fixed size of 9 bits from 3×3. The access control based on the permission information has been adopted by the OS of the Unix (registered trademark) system. If the permission information is adopted, the two areas described below are prepared as the file storage areas.

Basic file attribute area

The basic file attribute area is of a fixed size, in which the basic metadata information of the file such as the time of creating the file and the time of updating the file is stored. Furthermore, in the relevant area, the permission information of the file is stored.

User data area

In the user data area, user specified data is stored. Therefore, the user data area is of a variable size.

The other type, the ACL information, can define access right information for unspecified users. Furthermore, the ACL information can define a larger number of rights than the three types defined by the permission information. The typical OS performing the access control based on the ACL information is Windows NT (registered trademark). Note that the concrete examples of the ACL information are the POSIX ACL information, the NTFS ACL information, and the NFSv4 ACL information. Patent Literature 1 discloses the access control using the ACL.

Note that the ACL information, which stores access right information for various types of users, becomes the information of a variable size. Therefore, if the ACL information is adopted, instead of not including the permission information in the basic file attribute area, an extended file attribute area to store the ACL information is prepared as a file storage area. Note that the extended file attribute area is of a variable size, in which the metadata information of the file not stored in the basic file attribute area may be stored.

Since the above-mentioned sophisticated access control is possible, the file access control based on the ACL information is largely adopted in recent years. However, the access control based on the ACL information has a problem of high processing cost. That is because, while access control based on the permission information enables the processing only by reading the data in the basic file attribute area, access control based on the ACL information requires reading the data in the extended file attribute area.

Non-Patent Literature 1 discloses the speed-up technology for achieving the high-speed access control by using the ACL information stored in the extended file attribute area. As more specifically described, it is disclosed that, by storing various types of right information related to the file owner included in the ACL information in the basic file attribute area and, when performing the access control processing, firstly referring to the various types of right information stored in the basic file attribute area, the frequency of referring to the extended file attribute area is inhibited.

Note that the above-mentioned access control processing in which a part of the ACL information stored in the extended file attribute area is stored in the basic file attribute area and, at the time of the access control processing, the various types of right information stored in the basic file attribute area is precedingly referred to is called the preceding access control, and the file storage system comprising this type of control is called a preceding access control compliant file storage system.

CITATION LIST

Patent Literature
PTL 1: Japanese Unexamined Patent Application Publication No. 2009-75672
Non-Patent Literature
Non-Patent Literature 1: Andreas Gruenbacher: POSIX Access Control Lists on Linux, In Proceedings of the USENIX Annual Technical Conference (FREENIX Track), pp 259-272 (2003).

SUMMARY OF INVENTION

Technical Problem

However, as the technology disclosed by Non-Patent Literature 1 restricts the target of performance improvement to the access from the file owner, the range within which the performance of the access control processing can be improved is restricted. Therefore, in order to solve the foregoing problem, an object of this invention is to provide a storage system which can be applied to a broad range of access forms to the file and, at the same time, in which the performance of file access control processing is improved.

Solution to Problem

The storage system of this invention which achieves the above-mentioned object stores a part of the access control information of a variable size in the basic attribute area of the file, and stores the storage format information in the basic attribute area of the file or in the file system metadata area. At the time of processing the access to the file, with reference to the storage format information, the storage system decodes a part of the access control information into an access mask bit string as needed, and performs the preceding access control processing. If whether access is permitted or not can be determined through the preceding access control processing, the access control processing is performed while, whether access is permitted or not cannot be determined, the access control processing based on the extended attribute area information is performed.

Advantageous Effects of Invention

As described above, according to this invention, a storage system which can be applied to a broad range of access forms to the file and, at the same time, in which the performance of file access control processing is improved can be provided.

BRIEF DESCRIPTION OF DRAWINGS

FIG. 6 is a block diagram describing a storage format S.

FIG. 7 is a flowchart of the access processing to the file.

FIG. 9 is an image of an operation management screen for creating a file system.

DESCRIPTION OF EMBODIMENTS

An embodiment of the storage system related to this invention is described below. Note that, in the description below, though the information of this invention is described with expressions such as an "aaa table," an "aaa list," an "aaa DB," and an "aaa queue," these pieces of information are not necessarily limited to tables, lists, DBs, queues, and others, and may also be expressed by other types of data configuration than the above. Therefore, for indicating the independence of any data configuration, an "aaa table," an "aaa list," an "aaa DB," an "aaa queue," and others are also referred to as "aaa information."

Furthermore, for describing the contents of each piece of information, the expressions "identification information," "identifiers," "names," "names," and "IDs" are used, and these may be replaced by one another.

Though the description below may be made with a "program" as a subject, since the program performs the specified processing by being executed by the CPU, using the memory and the communication port (communication control device), the description may also be made with a CPU as a subject. Furthermore, the processing disclosed with the program as a subject may also be the processing performed by the computer which performs the program. Furthermore, a part of the program or the entire program may also be realized by dedicated hardware.

Furthermore, the various types of programs may also be installed to the respective computers by the program distribution server or storage media.

Figure 1:
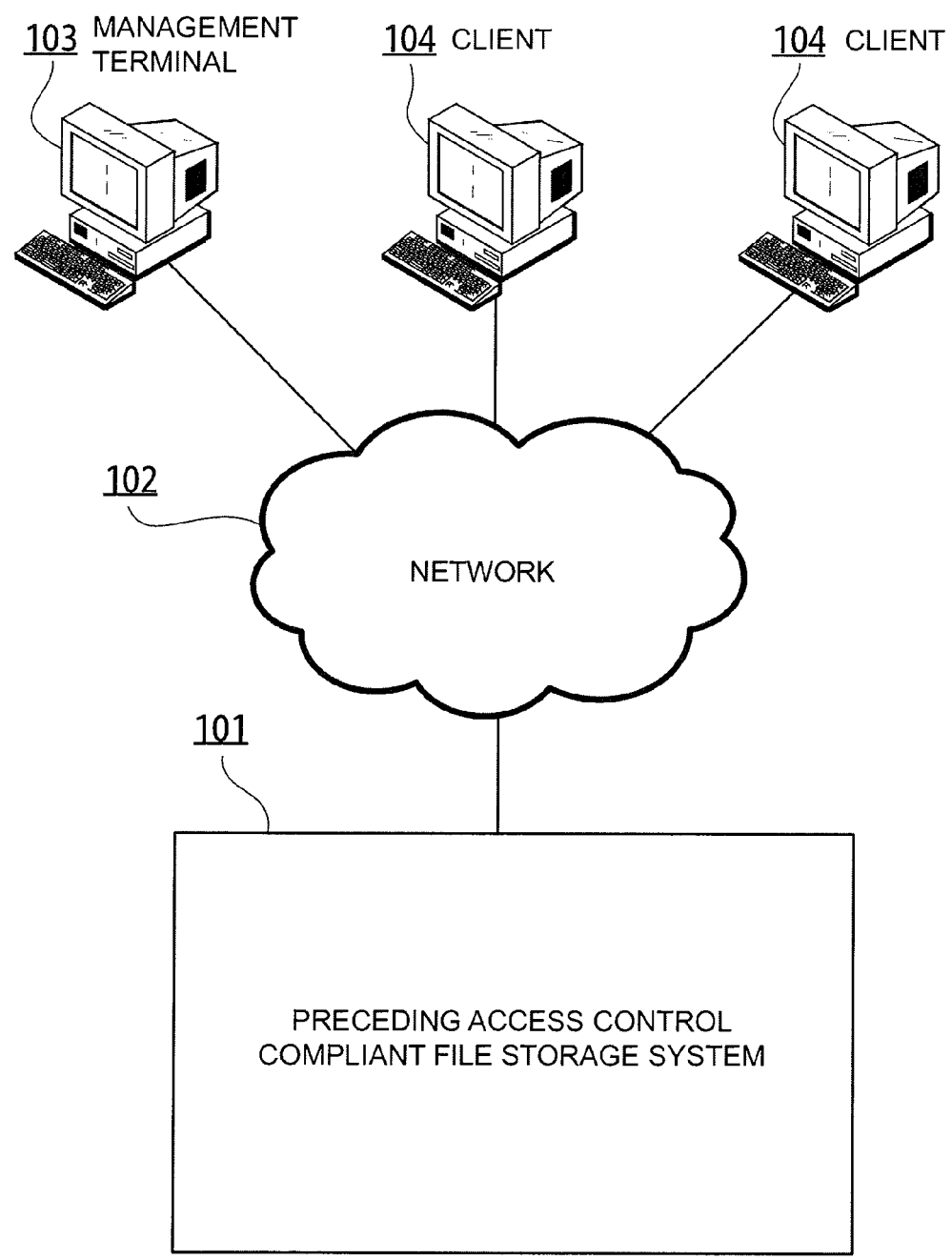
FIG. 1 is a block diagram of an example of a computer system comprising a storage system.

FIG. 1 shows a block diagram of the computer system of this invention. In this computer system, the storage system is provided as a preceding access control compliant file storage system.

In this computer system, the preceding access control compliant file storage system 101 is coupled to one or more clients 104 and a management terminal 103 via a network 102. At this point, the network is an IP network, an FC network, or others. Meanwhile, the management terminal is a computer for changing the setting information of the preceding access control compliant file storage system. Note that the management terminal 103 comprises input/output devices. As examples of the input/output devices, a display, a keyboard, and a pointer device can be considered, but other devices may also be used. Furthermore, the preceding access control compliant file storage system 101 may also comprise the input/output devices for assuming the role equivalent to the management terminal.

The client 104 is the computer which transmits a file access request (also simply abbreviated as an access request) to the preceding access control compliant file storage system and, depending on the request type, receives a response or data. Note that the examples of the access request types which the client 104 transmits include the following. However, the file storage system does not need to comprise all of the types below.

Open request

This request includes the identifiers of the open target file (name, relative path name, absolute path name, file identifier acquired by another request, and others). Note that the client 104 receives a file handle identifier from the file storage system as a response to the relevant request. Note that the file storage system which received the relevant request generates a value named a current position value corresponding to each file handle identifier, and sets the same to zero. Note that the current position value is a value indicating the starting address for performing data transmission or reception by a read request or a write request to be described later.

Close request

This request includes a file handle identifier.

Read request

This request, for specifying a read target file, includes a (1) file handle identifier or the (2) above-mentioned file identifier. Furthermore, the relevant request specifies the read data length as a parameter for specifying the range of the user data as the read target.

Note that, in response to the relevant request, the file storage system transmits a part of the user data with the address range in which the address indicated by the above-mentioned current position value is the starting address and the value of the read data length added to the current position value is the ending address to the client 104. Note that this part of the user data transmitted in response to the read request may be referred to as read data. Note that the read request may also specify the above-mentioned starting address. Furthermore, the file storage system may also update the current position value after the relevant processing is completed (e.g. update to the address next to the ending address).

Write request

The relevant request, for specifying a write target file, includes a (1) file handle identifier or the (2) above-mentioned file identifier. Furthermore, the relevant request specifies the write data length as a parameter for specifying the range of the user data as the write target. Then, the client 104, after the relevant request, transmits the write data of the size of the above-mentioned write data length to the file storage system. The file storage system updates the part of the user data with the address range in which the address indicated by the above-mentioned current position value is the starting address and the value of the write data length added to the current position value is the ending address to the transmitted write data.

Note that the write request may also specify the above-mentioned starting address. Furthermore, the file storage system may also update the current position value after the relevant processing is completed (e.g. update to the address next to the ending address).

Note that the above-mentioned various types of requests include the user identifiers for performing the file access control.

Figure 2:
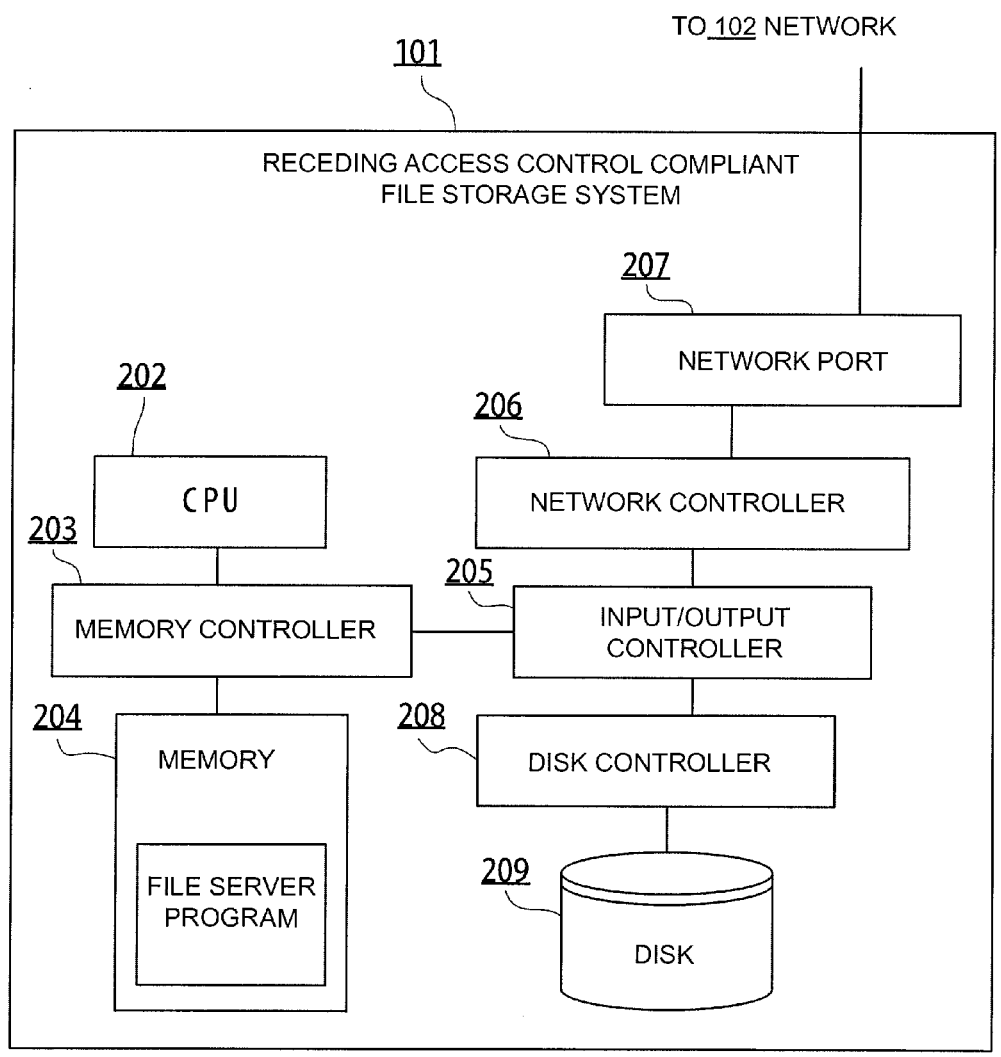
FIG. 2 is a hardware block diagram of a preceding access control compliant file storage system.

FIG. 2 shows a block diagram of the hardware configuration of the preceding access control compliant file storage system 101. The preceding access control compliant file storage system 101 comprises a CPU 202, a memory controller 203, a memory 204, an input/output controller 205, a network controller 206, a network port 207, a disk controller 208, and a disk 209.

The CPU 202, the memory 204, and the input/output controller 205 are coupled to the memory controller 203. The network controller 206 and the disk controller 208 are coupled to the input/output controller 205.

The memory 204 stores a preceding access control compliant file server program (hereinafter also abbreviated simply to a file server program). Note that the memory 204 may also be used as a cache memory of the disk 209. The CPU 202 performs the preceding access control compliant file server program.

The network port 207 is coupled to the network controller 206 and an external network 102. The disk (storage) 209 is coupled to the disk controller 208. The disk 209 may also be multiple or an external disk of the storage system.

The external disk may also be in the form of being coupled to the disk controller 208 in the storage system via the FC network. Note that the disk 209 is typically a device or an apparatus which accepts block level read/write requests by the specified data length (block size) as a unit. However, the disk 209 or the external disk may also be a Network Attached Storage (NAS).

Note that the CPU 202, the memory controller 203, the memory 204, the input/output controller 205, the network controller 206, the network port 207, and the disk controller 208 may also be referred to collectively as a file access controller. Note that the file access controller, if including one or more interfaces connectable to the CPU 202, the memory 204, the network 102 or/and the disk 209, may also be in a different type of hardware form from FIG. 2. The file access controller does not necessarily have to be configured of one electronic substrate.

Figure 3:
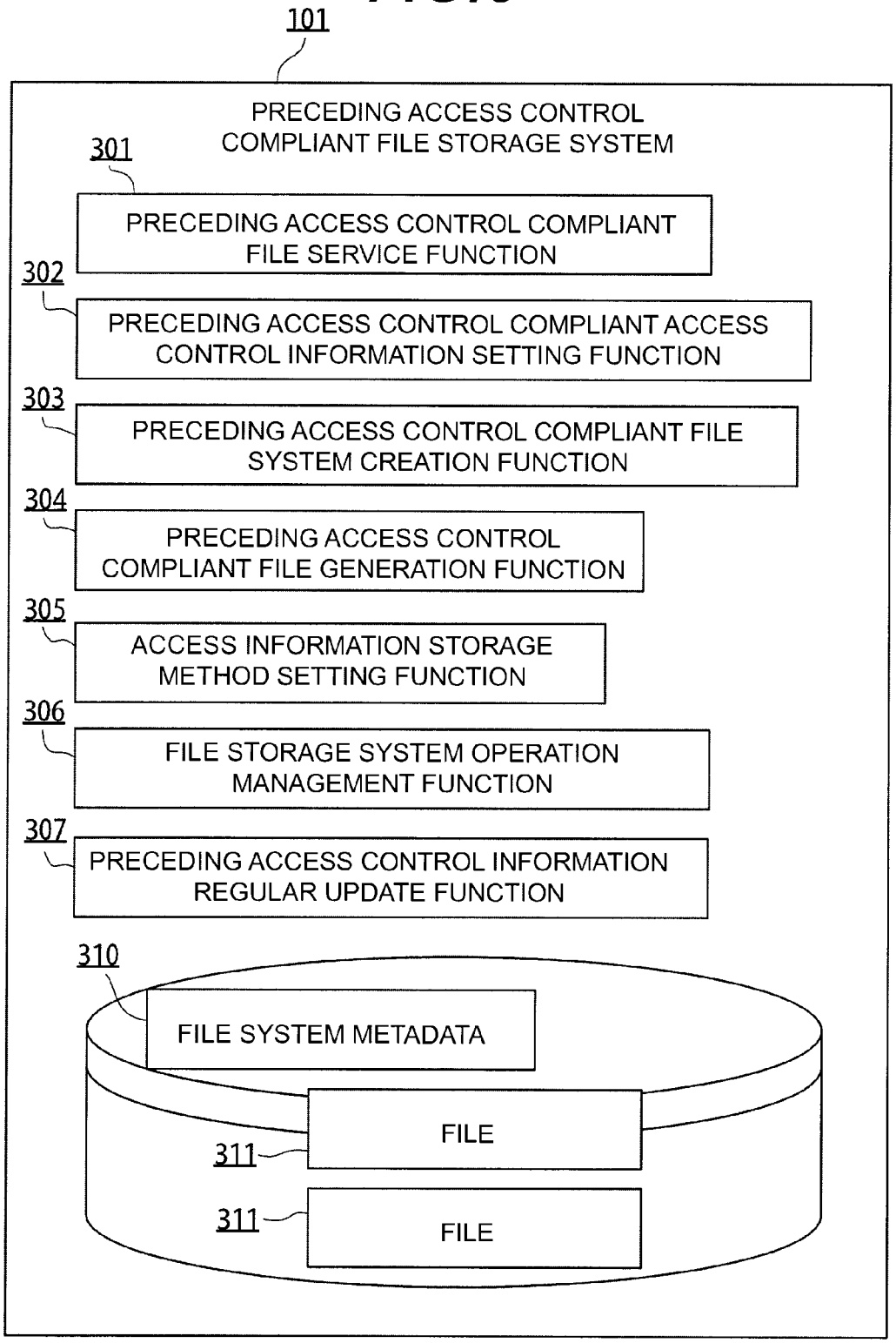
FIG. 3 is a block diagram showing the function configuration and the data configuration of the preceding access control compliant file storage system.

FIG. 3 shows a block diagram of the function configuration and the data configuration of the preceding access control compliant file storage system 101 of this invention.

The file server program, as shown in FIG. 3, comprises a preceding access control file service function 301, a preceding access control compliant access control information setting function 302, a preceding access control compliant file system creation function 303, a preceding access control compliant file generation function 304, an access information storage format setting function 305, a file storage system operation management function 306, and a preceding access control information regular update function 307.

Note that, though the respective types of functions described at this point are substantially subroutines or code modules included in the programs, a part of the functions may also be realized by hardware other than the CPU. Furthermore, the respective types of functions do not have to be explicitly separated from the other functions as program codes.

The preceding access control file service function 301 is the function for processing file access requests from the client or the process on the server.

The preceding access control compliant access control information setting function 302 is the function for performing the processing of updating the entire access control information 412 to be described later and the processing of updating the file level preceding access control information 411. This function is performed in response to an access control information setting request or a normal file access request from the client or the process on the server.

The preceding access control compliant file system creation function 303 is a function for creating the file system corresponding to the preceding access control in the disk 209.

The preceding access control compliant file generation function 304 is a function for processing a file creation request from the client or the server process.

The access information storage format setting function 305 is a function performed when setting the file level preceding access control information 411 to be described later.

The file storage system operation management function 306 is a function for generating and updating the setting information of the file storage system 101 with reference to the input information transmitted from the management terminal 103. Furthermore, this function, by transmitting a part of or all the contents of the setting information of the file storage system 101 to the management terminal 103, can also make the management terminal display the setting contents of the file storage system 101.

The preceding access control information regular update function 307 is the function performed when regularly updating the file level preceding access control information 411 to be described later.

In the disk 209, a file system is constructed by the processing of the file server program. In the disk 209 where the file system is constructed, a file system metadata area 310 which is a management area of the file system and a file 311 are generated.

Figure 4:
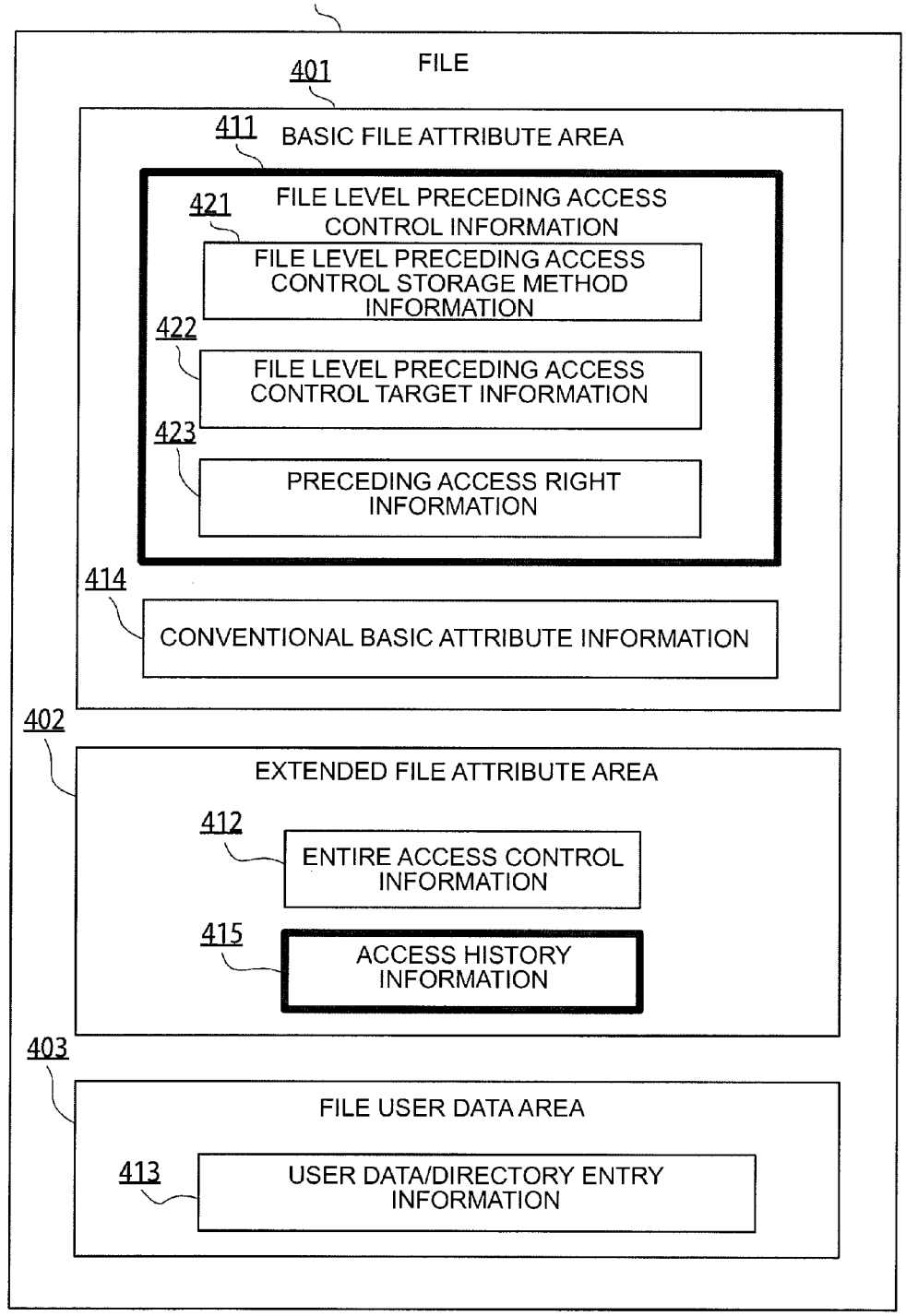
FIG. 4 is a block diagram showing the data configuration of the file stored in the preceding access control compliant file storage system.

FIG. 4 is a block diagram showing the data configuration of the file 311 stored in the file system of this invention. The file 311 comprises a basic file attribute area 401, an extended file attribute area 402, and a file user data area 403.

Furthermore, as described above, since the memory 204 may also be used as the cache memory of the disk 209, the expression of "storing various types of information and data in the disk" may also be interpreted as temporarily storing the storage target information and data in the memory 204 which is used as the cache memory and then storing the same in the disk 209.

Note that, though the basic file attribute area 401, the extended file attribute area 402, and the file user data area 403 typically exist in each file, a part of the information (e.g. a part of or all file user data areas) may also be the relevant area of the other files.

In the basic file attribute area 401, in addition to the conventional basic attribute information 414 in which the information such as the access time to the file (e.g. the last access time, the last update time, and others) is stored, the file level preceding access control information 411 corresponding to each file is stored. The file level preceding access control information 411 comprises file level preceding access control storage format information 421, file level preceding access control target information 422, and preceding access right information 423. Each of the 421, the 422, and the 423 may be a single entry, or may also be multiple entries for multiple targets.

Note that the conventional basic attribute information 414 includes the information by which the block address range in the disk 209 where the extended file attribute area 402 is stored can be identified (extended file attribute area block address information) and the information by which the block address range in the disk 209 where the file user data area 403 is stored can be identified (file user data area block address information).

The file level preceding access control storage format information 421 specifies the storage formats for the preceding access right information 423 and the file level preceding access control target information 422. These storage formats are described later.

In the file level preceding access control target information 422 and the preceding access right information 423, the identifier of the access control target user or group and one or more entries by which the type of access request which should be permitted or rejected for the target user or group can be precedingly determined are stored.

Note that this basic file attribute area may also include a storage area of the extended attribute which, even though classified as the extended attribute, is stored in the same data block as the basic attribute (in core metadata). An example of the above is the SHORT-FORM of the XFS file system. The basic file attribute area is the area fixed to the size specified at the time of constructing the file system.

In the extended file attribute area 402, the entire access control information 412 (also simply referred to as the access control information) and the access history information 415 are stored. In the entire access control information 412, one or more ACEs (Access Control Entries) which are the entries including the identifier of the access control target user or group and the access permission/rejection type list which specifies the access right for determining whether the access request should be permitted or rejected for the target user or group. Note that the above-mentioned ACL information is equivalent to the entire access control information 412. The entire access control information 412 is described later.

In the access history information 415, the identifier of the user that made a request for the access to the corresponding file, the type of the access permission/rejection list which is checked, and the history of the set access permission/rejection type list are stored. Note that, in the relevant information, the group identifier may also be stored as the history. Note that the identifier stored in the access history information 415, more preferably, should be organized in the data configuration by which the identifier of the user whose access request was received by the file server program in the later point in the past can be identified.

In the file user data area 403, the user data and/or the directory entry information 413 is stored. As more specifically described, the user data is stored if the object type to which the relevant area corresponds is a file while the directory entry information is stored if the object type is a directory (also referred to as a folder). Note that the directory entry information is the information which stored the information described below in each file or directory under the corresponding directory.

The name of the file and the directory under the corresponding directory

The file identifier

The file identifier is an identifier for identifying the file. Making the name of the file or directory and the path name changeable while creating and changing various types of information of the file as a different file each time the file is changed is high-load or causes inconvenience to the user, and therefore, this type of identifier is set.

Note that, though the description above, for convenience, assumed the information 421, 422, and 423 to be included in the file level preceding access control information 421, the actual data configuration does not necessarily have to perform the grouping of file level preceding access control information 421. The same applies to the information included in the conventional basic attribute information 414.

For processing a read request and a write request to the file, the file server program, by searching the directory entry information 413 with reference to these requests themselves or the file name and the path name included in the open request received ahead of these requests, identifies the file identifier. Subsequently, the relevant program, by reading the basic file attribute area 401 identified by this file identifier in accordance with the read request and the write request from the file 311 and referring to the file user data area block address information, identifies the area which is actually read or written.

Figure 21:
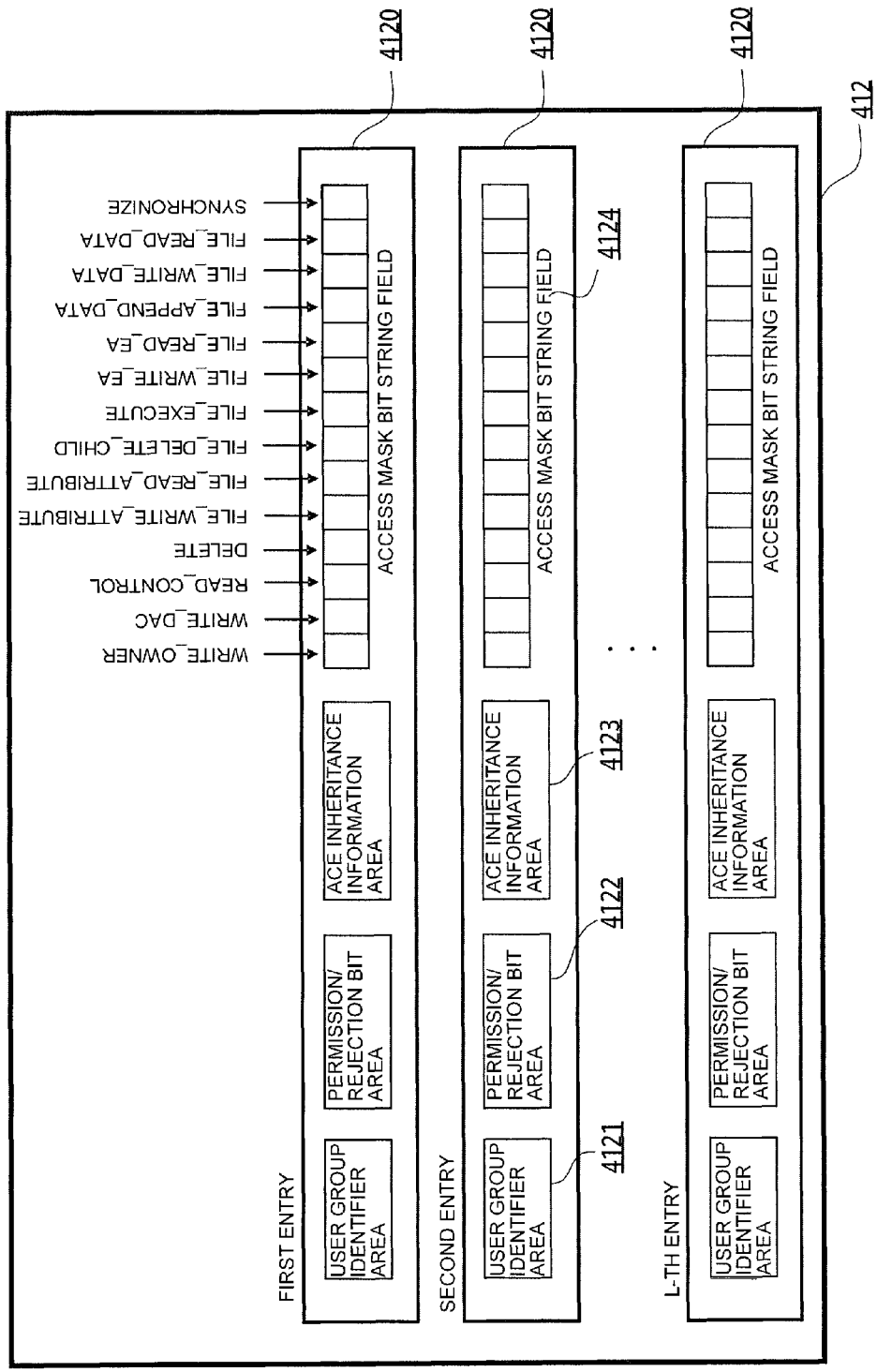
FIG. 21 is a block diagram showing the data configuration of the entire access control information.

FIG. 21 is a block diagram showing the data configuration of the entire access control information 412. The entire access control information 412, as described above, includes one or more ACEs 4120 (simply indicated as entries in the figure). Note that, as a matter of course, if the access control is not performed for the target file, no ACE 4120 is included in the corresponding entire access control information 412. An ACE includes a user group identifier area 4121, a permission/rejection bit area 4122, an ACE inheritance information area 4123, and a storage area 4124 of the above-mentioned access permission/rejection type list.

Note that, in the figure, the area storing the access permission/rejection type list is described as an access mask bit string field, and what is contained in the field is described as an access mask bit string. Note that, in the description below, though the term as the access mask bit string may be used, it goes without saying that this term may also be interpreted as an access permission/rejection type list which is more common.

The user group identifier area 4121 is the area for storing the identifier indicating the user or group to be subject to the access control by the ACE.

The permission/rejection bit area 4122 is the area showing whether the access permission/rejection type list 4124 is the description of the permission-based right or the description of the rejection-based right. In another expression, this is the information showing, if an entry configuring the access permission/rejection type list 4124 indicates True (O), whether the True means permission or rejection.

The ACE inheritance information area 4123 is the flag showing, if the object as the target of this ACE is a directory and if a file or directory is generated under the directory, whether the relevant ACE 4120 is included in the entire access control information 412 as a standard or not.

The access permission/rejection type list 4124 is the list showing the type of the access request to be permitted or rejected. The relevant list 4124 is, as more specifically described, a bit string in which an entry (which is actually a bit) is prepared for each file request for which the access control is desired to be set. Note that, in the figure, NTFS ACL is described as an example, and the meaning of each bit is as described below.

1. Owner update right (WRITE_OWNER)
2. Access control information update right (WRITE_DAC)
3. Access control information reference right (READ_CONTROL)
4. Deletion right (DELETE)
5. Basic attribute update right (FILE_WRITE_ATTRIBUTE)
6. Basic attribute reference right (FILE_READ_ATTRIBUTE)
7. Child file system object deletion right (FILE_DELETE_CHILD)
8. Execution right (FILE_EXECUTE)
9. Extended attribute update right (FILE_WRITE_EA)
10. Extended attribute reference right (FILE_READ_EA)
11. Data addition update right (FILE_APPEND_DATA)
12. Data overwrite update right (FILE_WRITE_DATA)
13. Data reference right (FILE_READ_DATA)
14. Synchronization right (SYNCHRONIZE)

Note that, though the description above is made with the NTFS ACL as an example of the entire access control information, it goes without saying that other types of ACL information such as NFSv4 ACL and POSIX ACL are also included.

Figure 22:
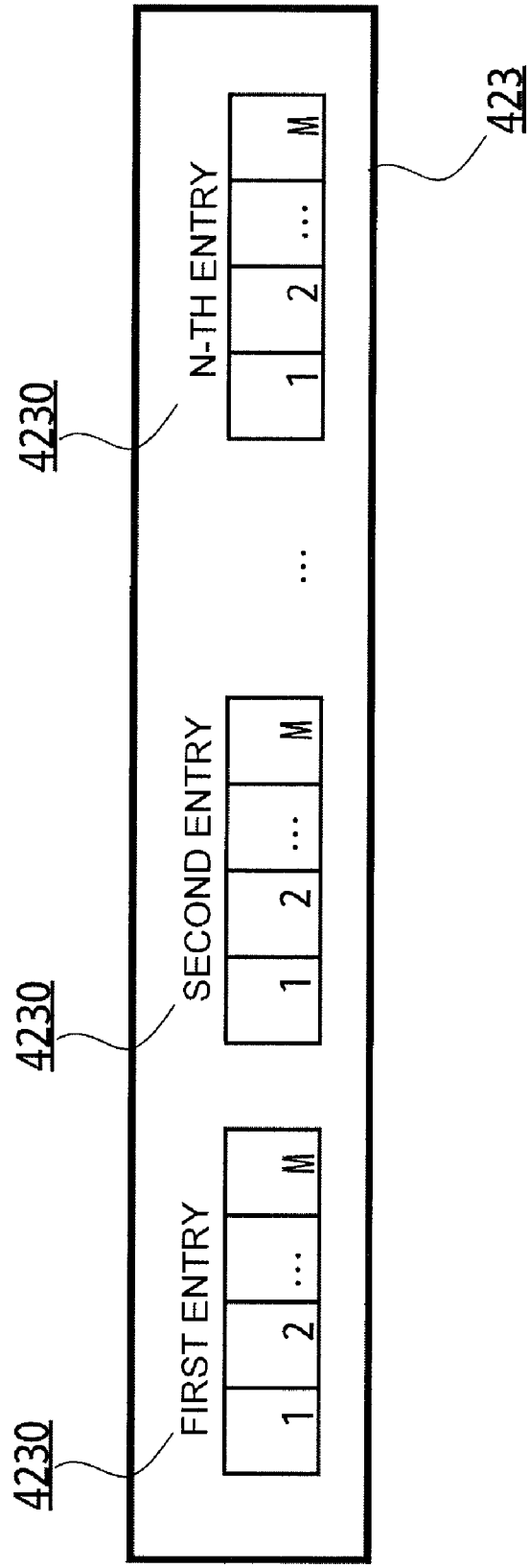
FIG. 22 is a block diagram showing the data configuration of the preceding access right information.

FIG. 22 is a diagram showing the data configuration of the preceding access right information 423. With reference to this drawing, the preceding access right information 423 and the file level preceding access control target information 422 are described.

As described above, in the file level preceding access control target information 422 and the preceding access right information 423, the identifier of the access control target user or group and one or more entries by which the type of access request which should be permitted or rejected for the target user or group can be precedingly determined are stored. These entries are the entries 4230 of the preceding access right information 423 and, though not shown in the drawings, the storage destination in the list of the identifier of the target user or group is the file level preceding access control target information 422.

The entries 4230 store the information converted from the ACE 4120 of the entire access control information in the storage format shown by the file level preceding access control storage format information. Note that the entries 4230 are of a fixed size.

Note that, as described above, as the preceding access right information 423 should comprise part of the data of the entire access control information 412, the area reduction may also be performed by deleting the information stored in the file level preceding access control information 421 from the entire access control information 412 (needless to say, this does not have to be performed).

Figure 5:
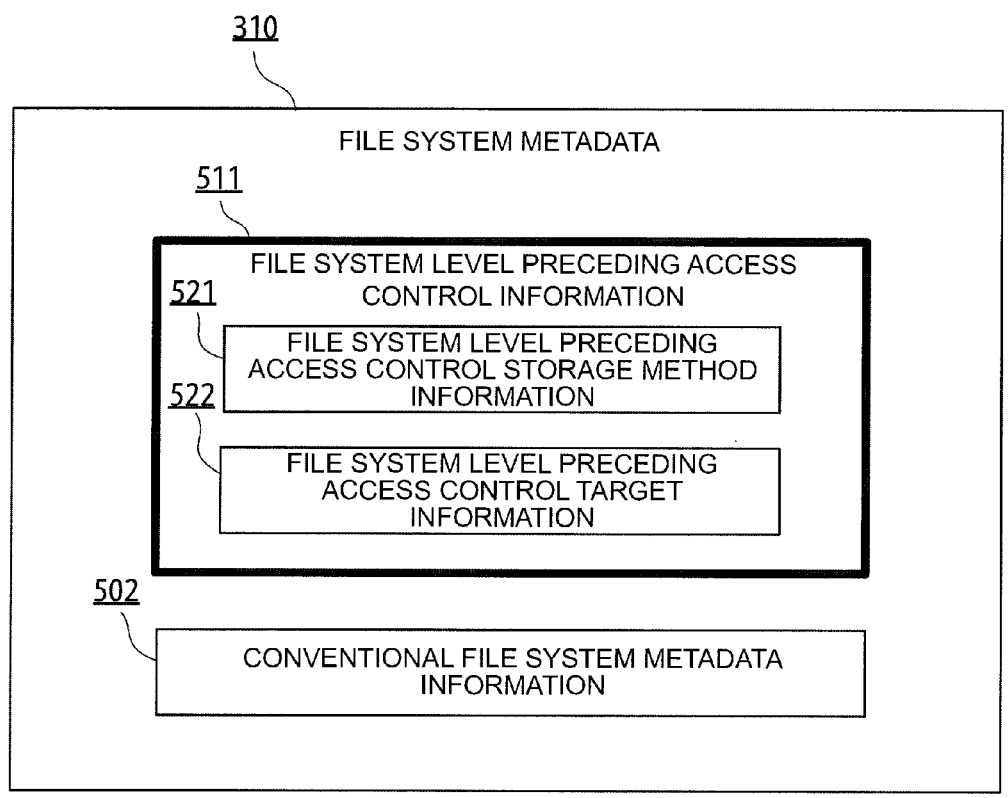
FIG. 5 is a block diagram showing the data configuration of the file system metadata stored in the preceding access control compliant file storage system.

FIG. 5 shows a block diagram of the data configuration of the file system metadata area 310 (FIG. 3) stored in the file system of this invention. In the file system metadata area 310, in addition to conventional file system metadata information 502, file system level preceding access control information 511 is stored. The file system level preceding access control information 511 comprises file system level preceding access control storage format information 521 and file system level preceding access control target information 522. Each of the 521 and the 522 may be a single entry, or may also be multiple entries for multiple targets.

The file system level preceding access control storage format information 521 specifies the storage formats for the preceding access right information 423 and the file level preceding access control target information 422.

In the embodiment below, how the information described in FIG. 4 and FIG. 5 is used is explicitly described, but a part of the information may not be used. In the foregoing case, the unused information may also be excluded from the configuration of FIG. 4 and FIG. 5.

The "storage formats" referred to in FIG. 4 and FIG. 5 are described below. As the preceding access right information 423 in the basic file attribute area 401 is of a fixed size, if the ACE of the entire access right information 412 of the extended file attribute area is stored in the basic attribute area, the amount of data which can be stored is limited. For example, assuming that the access mask bit string field 4124 is of 14 bits, storing all of the same in the basic attribute area may be difficult. The amount of the information which can be stored in the basic file attribute area from the extended file attribute area is limited by the number of bits of the preceding access right information 423.

Therefore, the storage system 101 stores the limited number of bits smaller than the number of bits in the access mask bit string from the extended file attribute area to the basic file attribute area, performs the access control processing in accordance only with the information of the basic file attribute area, and specifies multiple storage formats by which the access control processing can be completed immediately. By the administrator and the user of the file storage system predicting the form of access to the file in advance and setting the most suitable storage format for the file, the storage system performs the file access control processing efficiently. The basic storage formats for storing ACEs from the extended file attribute area to the basic file attribute area are the five types described below.

"Storage Method U"

The method of preferentially storing the access mask bit string which is frequently used, as the preceding access right information, from the extended file attribute area to the basic file attribute area. At this point, to "use" indicates, when processing a file access request, for determining whether the file may be accessed or not, referring to a part of the bits in the access mask bit string. The entry 4230 in the preceding access right information 423 stores a group of bits which are preferentially stored from the entire access control information 412 in the extended file attribute area 402.

For example, if the frequency of reference requests for a file is high, the preceding access control compliant file server program preferentially stores the FILE_READ_DATA bit in the preceding access right information 423 of the relevant file. In other cases where the frequency of the lookup requests for a directory is high, the file server program stores the FILE_EXECUTE bit in the preceding access right information 423 of the relevant directory.

This method is effective if the file operation to be executed (file request processing) is biased such as in the above-mentioned case where the frequency of file reference request is high and other cases and if the access mask bits to be used for the access control is biased. Note that the frequency of using the access mask bit may also be determined by the preceding access control compliant file server program referring to the logs related to the setting of the access mask bit.

"Storage Method S"

By the user, the information of the pattern of the frequently set access mask bit string is preferentially stored in the preceding access right information 423. At this point, to "set" indicates updating the access control information, for example, as for NFS, the access mask bit string which is input when executing chmod and setfacl commands and, as for CIFS, the access mask bit string which is input when executing CACLS /G and CACLS /P commands.

These are the examples where the access control information is updated via a CLI, and the cases of updating the access control information via the GUI are also included. For example, as for CIFS, the access control information can be updated from the security tag of the file property.

FIG. 6 shows an access mask bit string of this method. The correspondence relationship to the 14-bit ACE mask bit string of NTFS ACL is shown. For example, in the example of this figure, as the patterns of the access mask bit string to which the storage format S corresponds, five types of access patterns, which are the simple setting patterns of CIFS, "Full control," "Change," "Read and execute," "Read," and "Write," are prepared.

In this storage format, if the access mask bit string pattern set by the user matches the access mask bit string pattern to which the storage format S corresponds, a specified value is stored as the preceding access right information.

The preceding access control compliant file server program checks whether the input information received at the time of changing the access control information (if the access mask bit string itself is input) or the access mask bit string changed in accordance with the input information matches the simple setting pattern or not and, if the pattern is matched, the value is stored in the preceding access right information 423.

The preceding access control compliant file server program, when processing the file access control with reference to the basic file attribute area 401, decodes the value of the preceding access right information 423 to the access mask bit string in the right side of FIG. 6 and, with reference to the decoded access right information, determines whether the file access is permitted or not. This method is effective if the access mask setting pattern is biased.

The correspondence relationship shown in FIG. 6 between the setting pattern and all the access mask bit strings is set as a table in the specified area of the memory 204 in advance. Decoding is performed by the CPU 202 with reference to the decode table. This decode table may be in the file system metadata area 310 or may also be maintained by the preceding access control compliant file service function 301 as a static program data.

"Storage Method A"

The method of assigning the AND of multiple access mask bits to a single bit, and storing one or more of these AND bits in the preceding access right information 423. For storing as many access mask bits as possible in the preceding access right information 423, the AND of multiple access mask bits must be mapped to a single bit.

For example, the AND of the FILE_APPEND_DATA bit and the FILE_WRITE_DATA bit is mapped to a single bit, a bit 1, and the AND of the FILE_READ_DATA bit and the FILE_READ_ATTRIBUTE bit is mapped to a single bit, a bit 2. Then, this bit 1 and the bit 2 are stored in the preceding access right information 423.

For mapping the AND of multiple access mask bits to a single bit, the considerations such as making the mask bits whose probability of being set simultaneously is high the target of the AND, storing the mask bits as is whose probability of being used for the access control processing is high, without making the input target of the AND, and excluding the mask bits whose probability of being used is low from both the input target of the AND and the storage target become important. By these considerations, the probability of the AND becoming true becomes high, and the possibility of being able to determine the access only with reference to the preceding access right information becomes high. This method is effective if the percentage of multiple access mask bits becoming true is high.

"Storage Method P"

The method of assigning the AND of multiple access mask bits required for performing a procedure or a system call to a single bit, and storing one or more of these AND bits in the preceding access right information 423. This method is effective if the procedure or the system call to be performed is biased.

"Storage Method F"

This is the method of storing all the access mask bits in the basic attribute area. This method can be applied if the size of the preceding access right information 423 is 14 bits or larger. By this method, the access control processing in all the operations for the user or group whose target ACE is stored in the basic attribute area is accelerated.

The examples of the storage formats in this invention have been described above. To summarize the above-mentioned storage formats excluding the storage format F, the storage formats can be classified into the pattern of selecting a part of all the access mask bits in the extended area of the file and storing the same in the basic attribute area, the pattern of preparing multiple forms of combining multiple access mask bits stored in the basic attribute area in advance, mapping the identified values to the respective forms, and storing the identified values in the basic attribute area, and the pattern of fitting multiple access mask bits in a single or a small number of representative bits. In case of the latter two, the storage system decodes the identified values or the representative bits of the preceding access right information 423 in the basic attribute area by using the decode table and the function, and performs the access control to the file. Furthermore, the storage format U, the storage format S, the storage format A, and storage format P have the advantage that the capacity consumption of the basic file attribute area which is of a fixed size can be kept smaller than by the storage format F.

A plurality of the above-mentioned storage formats may also be combined. For example, in case of the storage format S, if the size of the preceding access right information 423 is larger than the number of representative access mask setting patterns, the method of using the residual bits as the storage format U can be considered. The above-mentioned storage format is an example and does not exclude any other methods.

Figure 20:
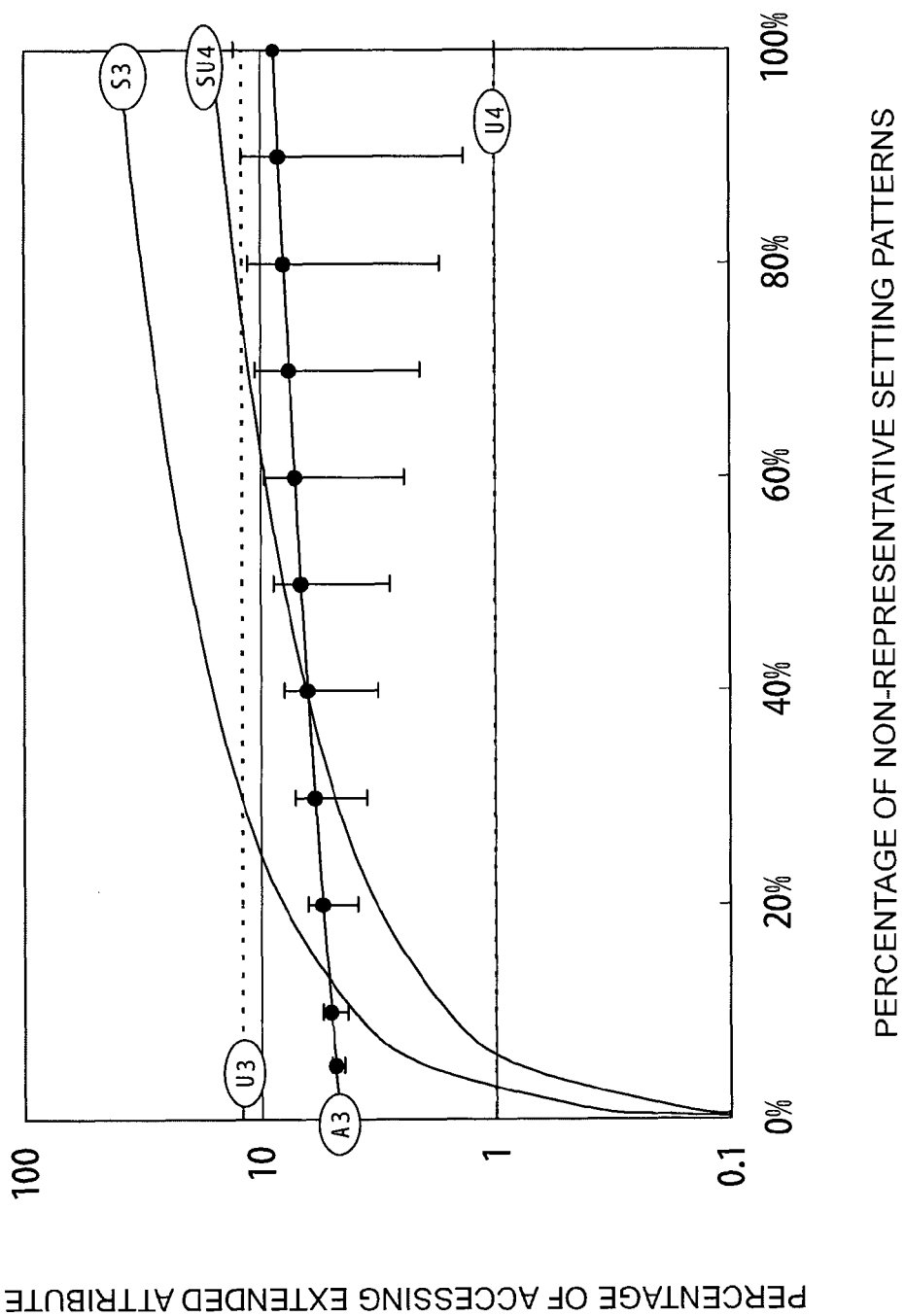
FIG. 20 is a graph comparing the effects of the respective storage formats.

The most suitable storage format depends on the conditions and the situation. FIG. 20 shows the result of comparison of the effects of (multiple) storage formats assuming the workload of typical file access benchmark for the access from the client 104.

The horizontal axis shows the percentage of non-representative setting patterns while the vertical axis shows the percentage of accessing the extended attribute, that is, the percentage of accessing the extended file attribute area because, though a part of the access mask bit strings of the extended file attribute area is stored in the basic file attribute area, this information is not sufficient for the access control. The horizontal axis is on a linear scale and the vertical axis is on a log scale. As the percentage of accessing the extended file attribute area is smaller, that is, as the value is in the lower part of the graph, the performance improvement effect is higher.

The S3 has the storage format S and the 3-bit storage area of the entries 4230 of the preceding access right information 423, the U3 has the storage format U and the 3-bit storage area of the entries 4230, the U4 has the storage format U and the 4-bit storage area of the entries 4230, the A3 has the storage format A and the 3-bit storage area of the entries 4230, and the SU4 has the combined method of the storage format S and the storage format U and the 4-bit storage area of the entries 4230, of which 3 bits are assigned to the S and 1 bit is assigned to the U.

Though combination of the storage format S and the storage format U in this comparison example assigns only 1 bit to the U, the assignment is not specifically limited, and the storage format in which two or more bits as SU5, SU6, are assigned to the U is also possible. Furthermore, the number of bits assigned to the storage format S is not limited to 3 either.

The representative setting patterns in the horizontal axis are, for example, as shown above, the five patterns of CIFS, "Full control," "Change," "Read and execute," "Read," and "Write," or the four patterns of NFS, "rwx," "rw-," "r-x," and "r--," or the combination of the above.

Therefore, the percentage of the non-representative setting patterns of the horizontal axis are normally considered to be approximately 5% or smaller and, if the storage area of the entry 4230 in the preceding access right information 423 is configured of 3 bits, the storage format S is the most effective. If the storage area of the entry 4230 in the preceding access right information 423 is configured of 4 bits, the combination of the storage format S and the storage format U is the most effective. Though the embodiment below describes that the storage format is selectable, the theoretically or empirically most effective storage format may also be set by default.

Next, the access request processing for the file stored in the preceding access control compliant file storage system is described. This processing is achieved by the preceding access control compliant file service function 301. The access request is, for example, a system call from the local user or a network procedure from the user on the client.

FIG. 7 shows a flowchart of the access processing in this invention. The preceding access control compliant file service function 301, if receiving an access request, identifies the user of the access request (at this point, the group to which the user belongs may also be identified). Then, the preceding access control compliant file service function 301 repeats the steps from S701 to S705 for the number of entries in the file level preceding access control target information 422. The preceding access control compliant file service function 301, at S702, determines whether the access request source (i.e. the user) matches the N-th entry of the file level preceding access target information 422 or not. If the entry matches, the processing proceeds to S703 or, if it does not match, proceeds to S705.

The preceding access control compliant file service function 301, at S703, with reference to the file level preceding access control storage format information 421, decodes the N-th entry 4230 of the preceding access right information 423 to the form for which the access control can be performed, that is, the form of an access mask bit string. This processing, in the storage format S, indicates that the preceding access control compliant file service function 301, with reference to the mapping table, decodes the bit string stored in the N-th entry 4230 to a 14-bit ACE mask bit string of the NTFS ACL.

Meanwhile, in the storage formats A and P, the original access mask bit string is decoded from a single bit. For example, in the storage format A, if the bit corresponding to the AND of the FILE_APPEND_DATA bit and the FILE_WRITE_DATA bit is true, this indicates that the FILE_APPEND_DATA bit and the FILE_WRITE_DATA bit are decoded as being true. For example, in the storage format P, if the bit corresponding to the WRITE operation is true, this indicates that the FILE_APPEND_DATA bit, the FILE_WRITE_DATA bit, and the FILE_WRITE_ATTRIBUTE bit are decoded as being true. The preceding access control compliant file service function 301, if the decoding is successful, shifts the processing to S704 or, if the decoding is unsuccessful, shifts the processing to S705. The decode being unsuccessful indicates, for example, the case where, in the storage format S, the setting pattern is unused or other patterns and the case where, in the storage format U, the storage format P, and the storage format A, no access right information suitable for the access control determination is stored.

Note that the storage format U and the storage format F do not require any decode since a part of or all the access mask bit strings are stored (which can also be expressed as performing the decode by which the value is not changed before and after the decode).

The preceding access control compliant file service function 301, at S704, with reference to the access mask bit string decoded from the access right information, performs the access control processing. The preceding access control compliant file service function, if determining that the access control is permitted, shifts the processing to S709. If determining that the access control is not to be permitted, the function shifts the processing to S705.

The preceding access control compliant file service function, after estimating all the entries, if not determining the same to be permitted, acquires the entire access control information 412 from the extended file attribute area at S706 and shifts the processing to S707. At S707, the conventional access control processing is performed with reference to all the access mask bits in the extended file attribute area. If the bits are determined to be permitted, the function shifts the processing to S709. Note that the conventional access control processing indicates determining whether the access request type is permitted for the user or group or not by referring to the ACE in the entire access control information 412.

If the bits are determined not to be permitted, the preceding access control compliant file service function] shifts the processing to S708. At S708, the function performs the access right error processing, and completes the access processing. At S709, the function performs the access request processing, and completes the access processing.

In this flowchart, instead of the file level preceding access control target information 422, the file system level preceding access control target information 522 may also be used. Furthermore, instead of the file level preceding access control storage format information 421, the file system level preceding access control storage format information 521 may also be used.

Figure 8:
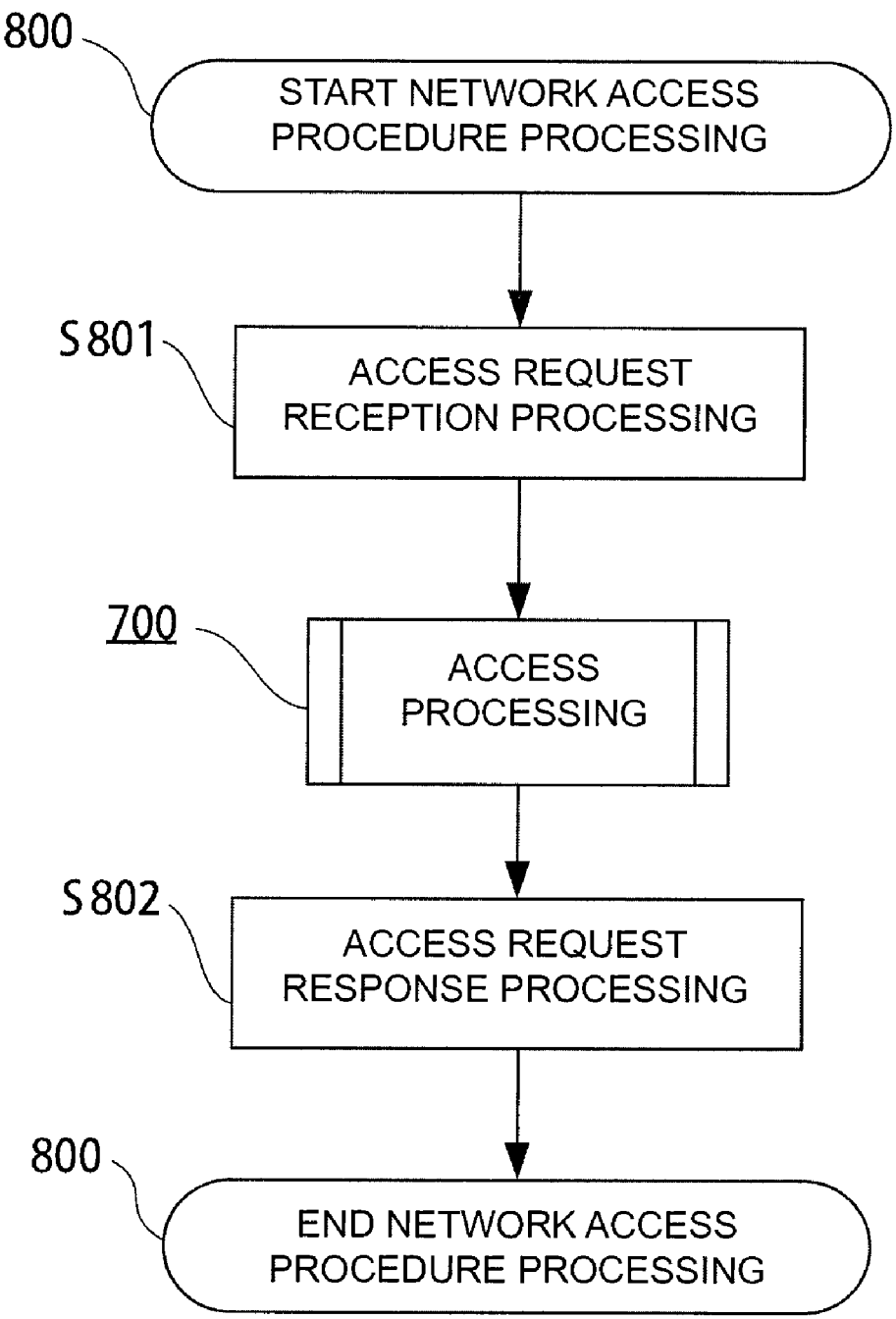
FIG. 8 is a flowchart of the network access procedure processing to the file.

FIG. 8 shows a flowchart of the network access procedure processing in this invention. The preceding access control compliant file server program, at S801, receives an access request from the client 104. Next, the program performs the access processing 700 in FIG. 7. Next, at S802, the program returns the result of the access processing 700 to the client 104. This is where the network access procedure processing is completed.

Next, the file system creation processing is described. This processing is performed by the preceding access control compliant file system creation function 303 and the file storage system operation management function 306.

FIG. 9 shows an image of the screen displayed in the management terminal for file system creation. On this screen image, in addition to the basic parameters which are specified in the conventional process of file system creation such as the file system name and the file system size, the tuning parameters related to the preceding access control information are displayed and input to the same is allowed.

The screen image displays the storage format, the target, and the preferential storage information as the preceding access control information, and this display changes via the input device of the management terminal in accordance with the storage format, the target, and the preferential storage information which are specified. The storage format is, as described above, selectable among the storage formats U, S, A, P, and F, the combination of the above, and other storage formats, and the input result is displayed.

As the target, following the permission information, the owner, the owner group, and others (equivalent to Others of NFS, Everyone of CIFS) can be selected by the input device, and furthermore, the specified user and the specified group can also be selected (the input target can be displayed as a matter of course). Furthermore, excluding the case of the storage format F, what type of information should be preferentially stored in the preceding access right information 423 is selected via the input device, and the selection result is displayed.

In FIG. 9, as an example of the storage format, the storage format S is shown. If the size of an entry of the preceding access right information is 3 bits, from $2^3-1$, the maximum of 7 types can be selected. In other cases with the storage format A, which access right and which access right should be stored as the target of the AND of the same bit is selected. These types of selection may also be performed as the automatic setting of the items recommended by the system.

As a result of the above-mentioned selection via the input device, the input information selected through pressing the OK button (not shown in FIG. 9) is delivered to the file server program. Note that this input can be utilized for other purposes than file system creation, and this screen image may also be displayed for confirming the setting after the file system creation.

Note that, though the description above assumes that one storage format is specified for one file system, if multiple users or groups exist as the control target, further storage formats and other information may also be specified for each of the users or groups.

Furthermore, it is also selectable what type of the default value should be set for the preceding access control information at the time of file creation. Whether to utilize the setting value of the file system or to inherit the setting information of the parent directory is selected.

Figure 10:
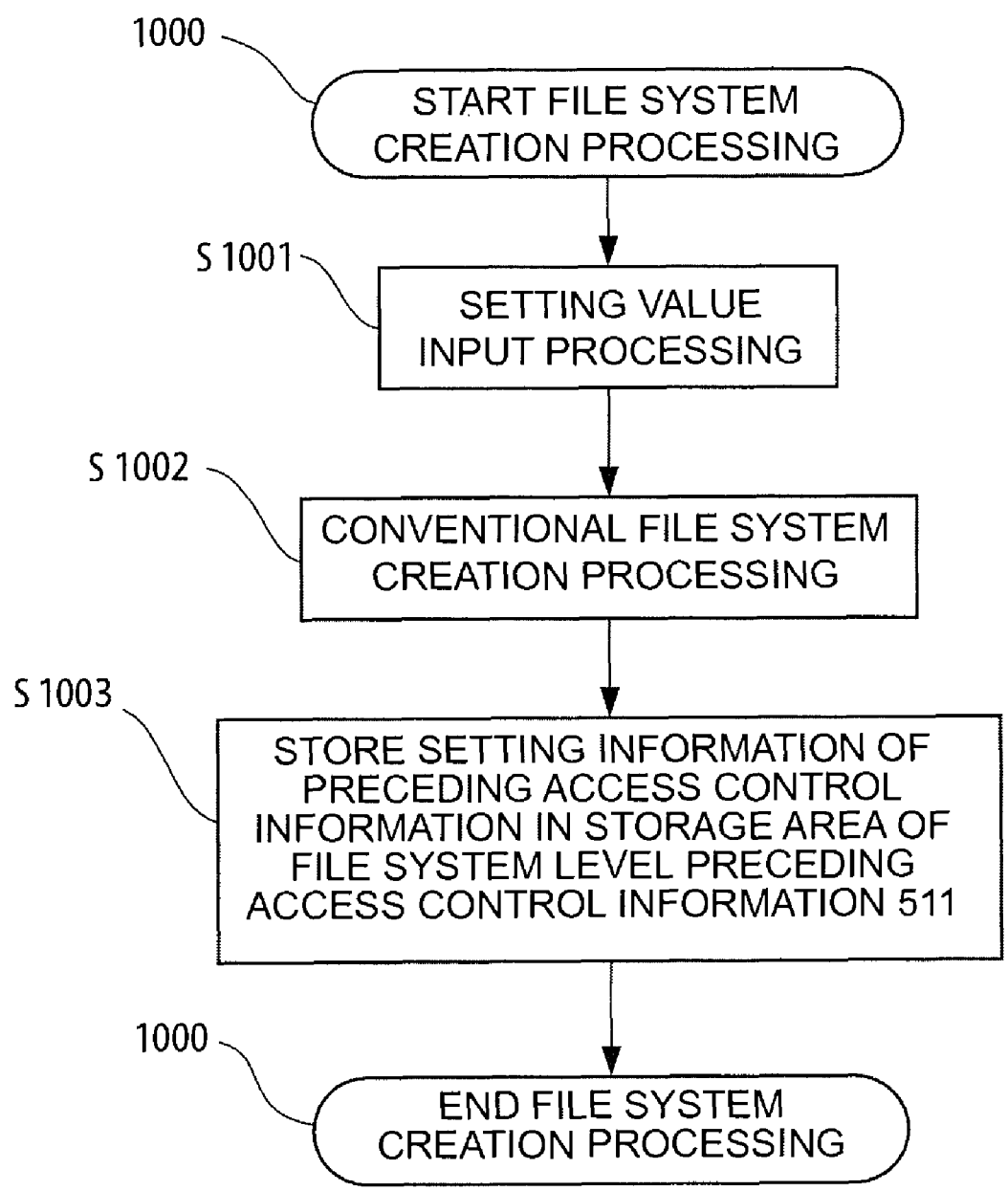
FIG. 10 is a flowchart of the file system creation processing.

FIG. 10 shows a flowchart of the file system creation processing.

The preceding access control compliant server program firstly receives the input to the setting value of the file system at S1001. This may be performed via the GUI shown in FIG. 9 or via the CLI which the equivalent input can be performed. Note that the concrete example of the input information is as shown in FIG. 9.

Next, at S1002, the preceding access control compliant server program performs the above-mentioned conventional file system creation processing.

Next, at S1003, the preceding access control compliant server program stores the input information of the preceding access control information and the default preceding access control information at the time of file creation in the file system level preceding access control information 511.

This is where the file system creation processing is completed.

Next, the file generation processing and the tuning information setting processing for the file are described below. These types of processing are performed by the preceding access control compliant file generation function 304, the access information storage format setting function 305, and the file storage system operation management function 306.

Figure 11:
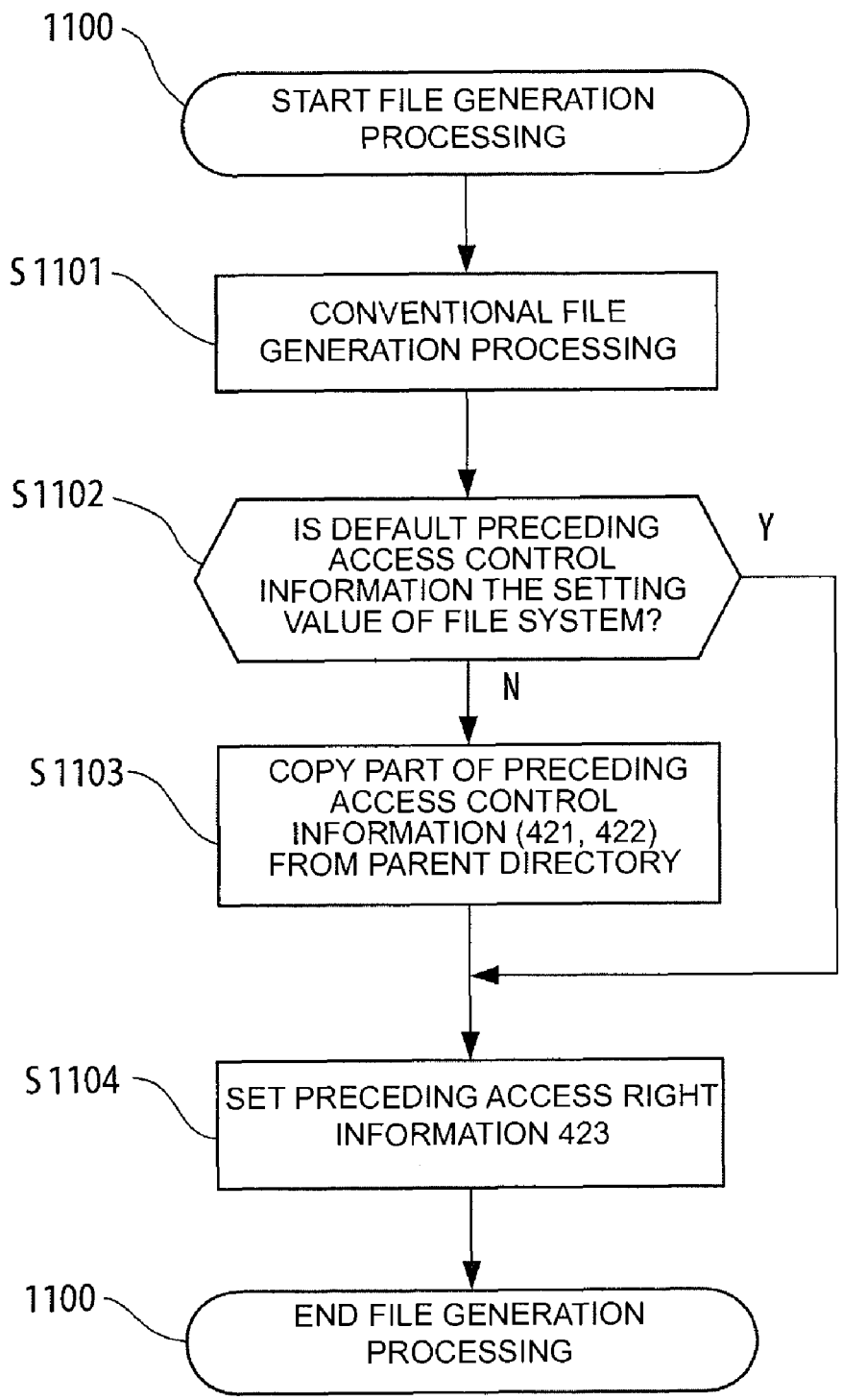
FIG. 11 is a flowchart of the file generation processing.

FIG. 11 is a flowchart of the file generation processing. This processing is performed as the file server program receives a file creation request which specifies a file name from another program performed inside the client or the file storage system or an open request which specifies a file name and a path name which do not exist at this time. The details are described below.

The preceding access control compliant server program, at S1101, performs the conventional file generation processing. Note that the conventional file generation processing indicates (1) assuming the free area of the file system as the basic file attribute area and initializing the value of the relevant area, (2) securing the extended file attribute area, creating the entire access control information of the generated file, and copying the inherited ACE of the entire access control information set for the parent directory to the generated entire access control information. Note that the above-mentioned (2) does not necessarily have to be performed. This is because, for example, there are some cases where the default value of the access right at the time of file generation can be set for each user.

The preceding access control compliantserver program, at S1102, determines whether to make the file level preceding access control information the setting value (default value) of the preceding access control information of the file system set in FIG. 9 or not. If making the information the file system setting value, the program shifts the processing to S1104. If not making the information the file system setting value, the program shifts the processing to S1103. This determination is performed by the setting value stored in the file system metadata area.

At S1103, the preceding access control compliant server program copies the file level preceding access control storage format information 421 and the file level preceding access control target information 422 which are a part of the file level preceding access control information 411 of the parent directory to the relevant area of the generated file. Note that copying the information 422 may also be omitted. This is because the target set in the parent directory is not necessarily inherited as is.

At 1104, if the file level preceding access control storage format information 421 or the file level preceding access control target information 422 is set, the preceding access control compliant server program, in accordance with those types of information and the entire access control information 412, generates a bit string to put in the entry 4230 of the preceding access right information 423 in the specified storage format, and stores the generated bit string in the entry 4230.

If the permission ACE related to the target of the preceding access control is the N-th entry of the entire access control information, the estimation result of the first to (N−1)th rejection entries is also set for the preceding access right information 423. For example, it is assumed that the target is a USER1, who belongs to a GROUP1, and that the first entry of the entire access control information is a rejection ACE related to the GROUP1 while the second entry is a permission ACE related to the USER1. In this case, even if FILE_READ_DATA is permitted in the second entry, if FILE_READ_DATA is rejected in the first entry, the permission is not set for the preceding access right information. In this case, in accordance with the change of the group members, the preceding access right information must be reset.

Note that, if the 421 and the 422 are not set or if no area exists for the same, instead of S1103, the preceding access control compliant server program, in accordance with the information of the file system level preceding access control storage format information 521, the file system level preceding access control target information 522, and the entire access control information 412, sets the preceding access right information 423. This is where the file generation processing is completed.

Figure 12:
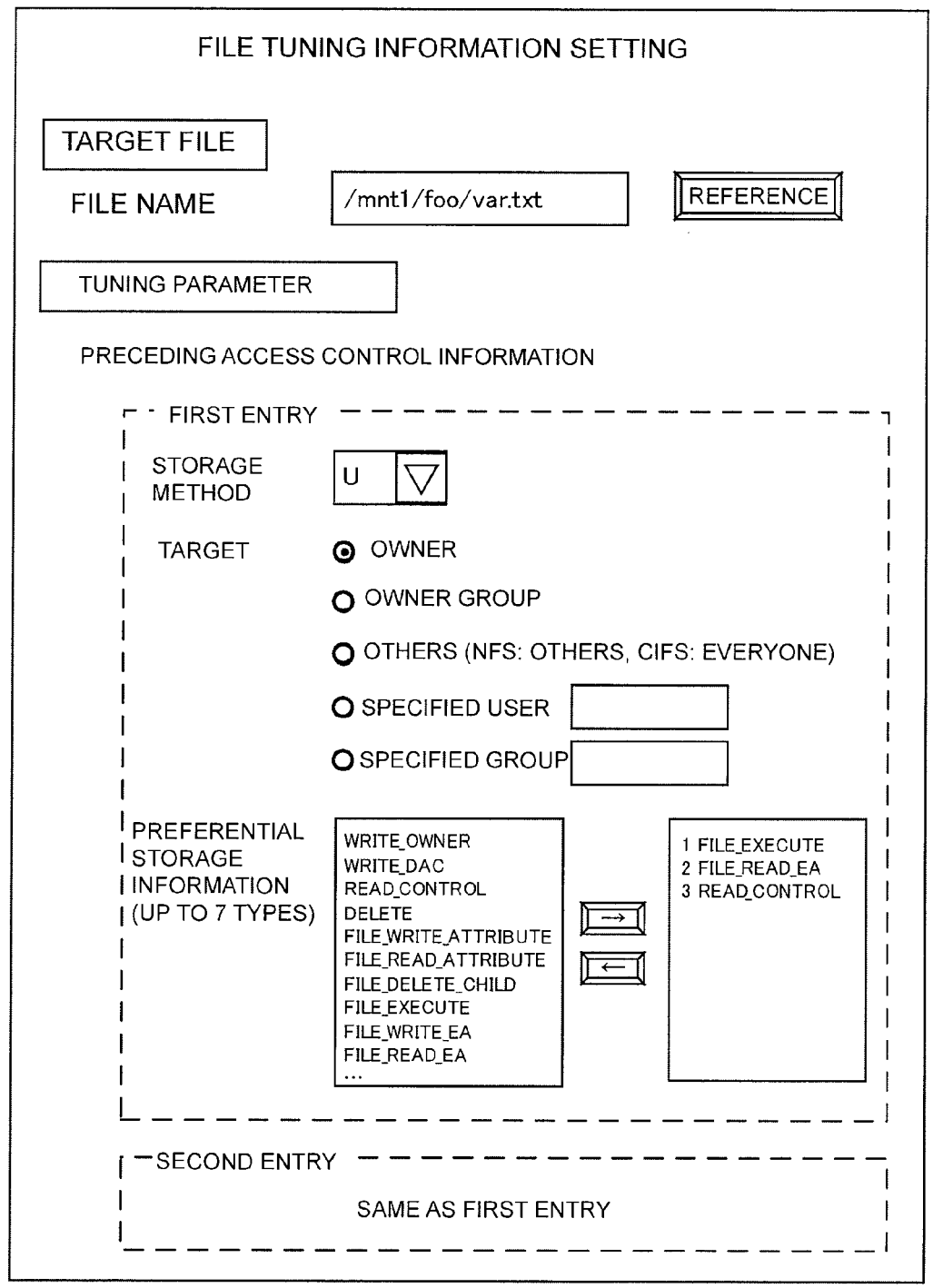
FIG. 12 is an image of an operation management screen of the file tuning information setting.

FIG. 12 shows a screen image of the file tuning information setting displayed on the management terminal 103. The preceding access control compliant server program selects the target file and performs the resetting related to the preceding access control information. This screen is used if the effect of the acceleration is small only by the preceding access right information set at the time of the file creation. As more specifically described, as FIG. 9, the file server program can receive the storage formats, targets, and pieces of preferential storage information selected by the administrator of the file storage system 101 as the input information for the number of entries, and can also display the information selected on the screen image in FIG. 12. FIG. 12 shows an example where the storage format after the tuning becomes U. By the storage format U, which access right information should be preferentially stored can be changed. Note that the administrator of the file storage system 101 may also be the user of the client 104.

As the basic attribute area of the file is not large, at the time of tuning, the settable parameters may also be limited to the storage formats or the storage formats and the limited target. At this point, the limited target is, for example, the file owner, the owner group, and other users. When limiting the settable parameters, the information not set on this screen is uniquely determined by the file system or the storage system.

Note that, though the example in FIG. 12 specifies a file, it may also be permitted to assume that, by specifying a directory, all the files are specified under the specified directory, or it may also be permitted to assume that, by specifying a user, that the specified user specifies the generated file.

Figure 13:
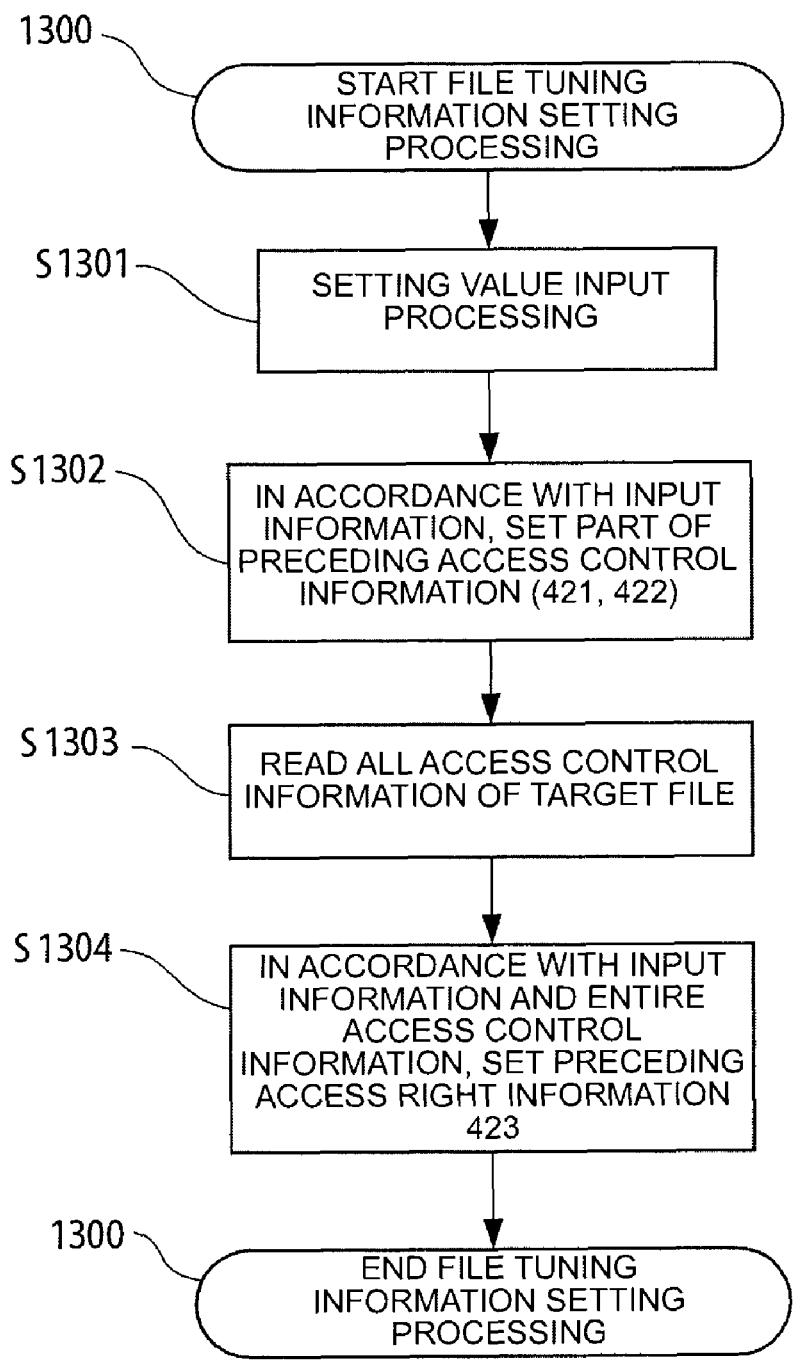
FIG. 13 is a flowchart of the file tuning information setting processing.

FIG. 13 is a flowchart of the tuning information setting processing of a file. This processing is performed by the file storage system operation management function 306.

The preceding access control compliant server program, at S1301, receives the input information of the file setting values. This may be performed via the GUI shown in FIG. 12 or via the CLI which the equivalent input can be performed. Note that the input information is described as shown in FIG. 12.

At S1302, in accordance with the input information, the preceding access control compliant server program sets or updates the file level preceding access control storage format information 421 and the file level preceding access control target information 422 which are a part of the file level preceding access control information 411.

Then, the preceding access control compliant server program, at S1303, reads the entire access control information 412 of the target file from the extended attribute area. At S1304, in accordance with the input information (FIG. 12) and the entire access control information 412, the program re-generates the preceding access right information 423. The concrete processing of the generation is as described in FIG. 11.

This is where the tuning information setting processing of the file is completed.

The method shown in FIG. 12 and FIG. 13 allows the user or group for determining the storage format and the preceding access processing to be changed for each file. This method, though consuming the capacity of the basic attribute area, has the advantage that, at the time of file access, the storage format and the preceding access processing determination target can be changed flexibly. For example, the file server keeps the history information of the access user and the request type for each file and, with reference to the history information, sets the information related to the highly frequently accessing user and the highly frequent operation as the basic attribute.

Meanwhile, in case of batch operations or others, as the access user and the request type can be predicted, the file server, in accordance with the predicted information, can previously set the access mask bit related to the user and the operation of which highly frequent access is predicted as a basic file attribute area.

Next, the access processing accompanied by the function of updating the preceding access control information and the same type of network access procedure processing are described below. These types of processing are performed by the preceding access control compliant file service function 301 and the preceding access control compliant access control information setting function 302.

Figure 14:
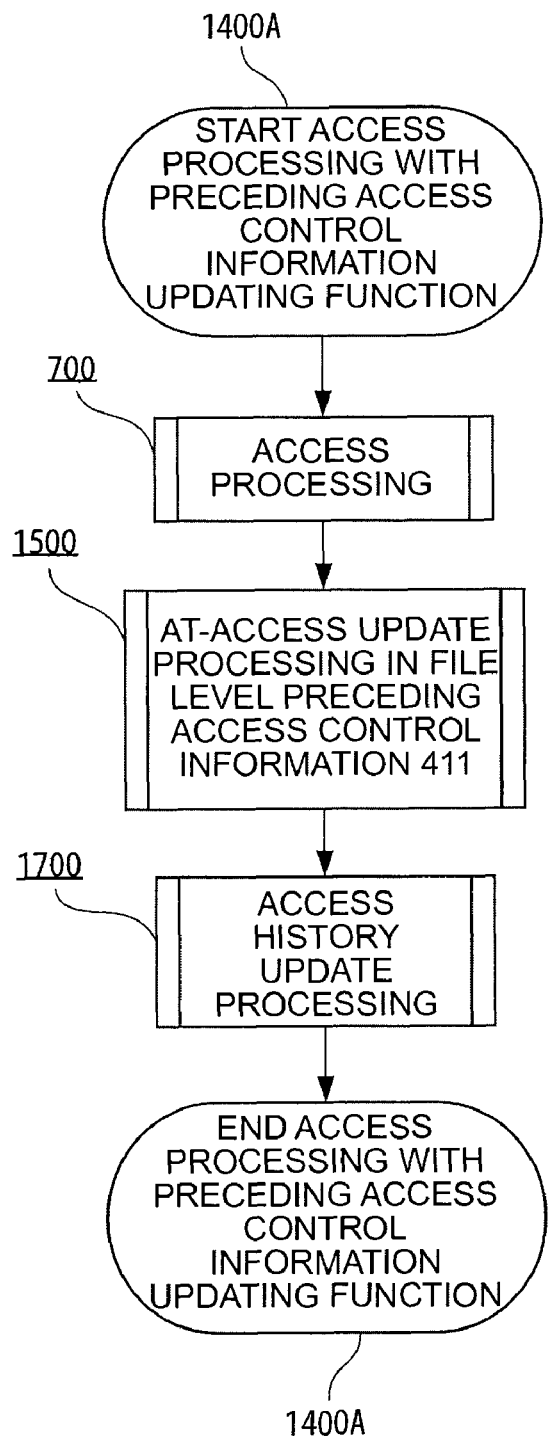
FIG. 14 is a flowchart of the access processing with the updating function of the preceding access control information.
Figure 23:
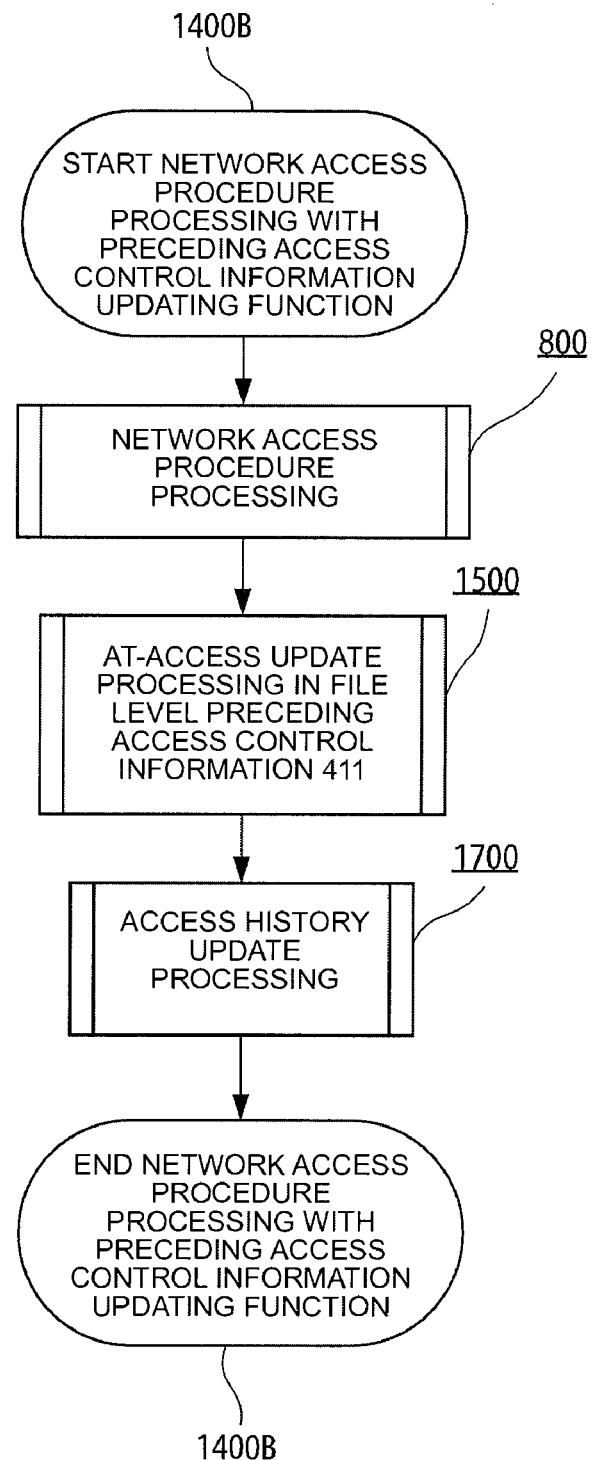
FIG. 23 is a flowchart of the network access procedure processing.

FIG. 14 is a flowchart of the access processing with the preceding access control information updating function, and FIG. 23 is a flowchart of the network access procedure processing with the preceding access control information updating function.

Note that the processing in FIG. 14 is the processing performed in accordance with the access request reception performed from the program performed inside the file storage system, and the processing in FIG. 23 is the processing performed in accordance with the access request reception from the client 104.

Firstly, the access processing with the preceding access control information updating function 1400A in FIG. 14 is described below. The preceding access control compliant server program firstly performs the access processing 700 described in FIG. 7. Next, the program performs the at-access update processing 1500 for the file level preceding access control. This processing is described later with reference to FIG. 15 and FIG. 16. Next, the access history update processing 1700 is described. This processing is described later with reference to FIG. 17.

Next, the network access procedure processing with the preceding access control information updating function 1400B in FIG. 23 is described below. The preceding access control server program firstly performs the network access procedure processing 800 described in FIG. 8. Next, the program performs the processing 1500 of updating the preceding access control information at the time of file access in the file level preceding access control, and performs the access history update processing 1700.

Figure 15:
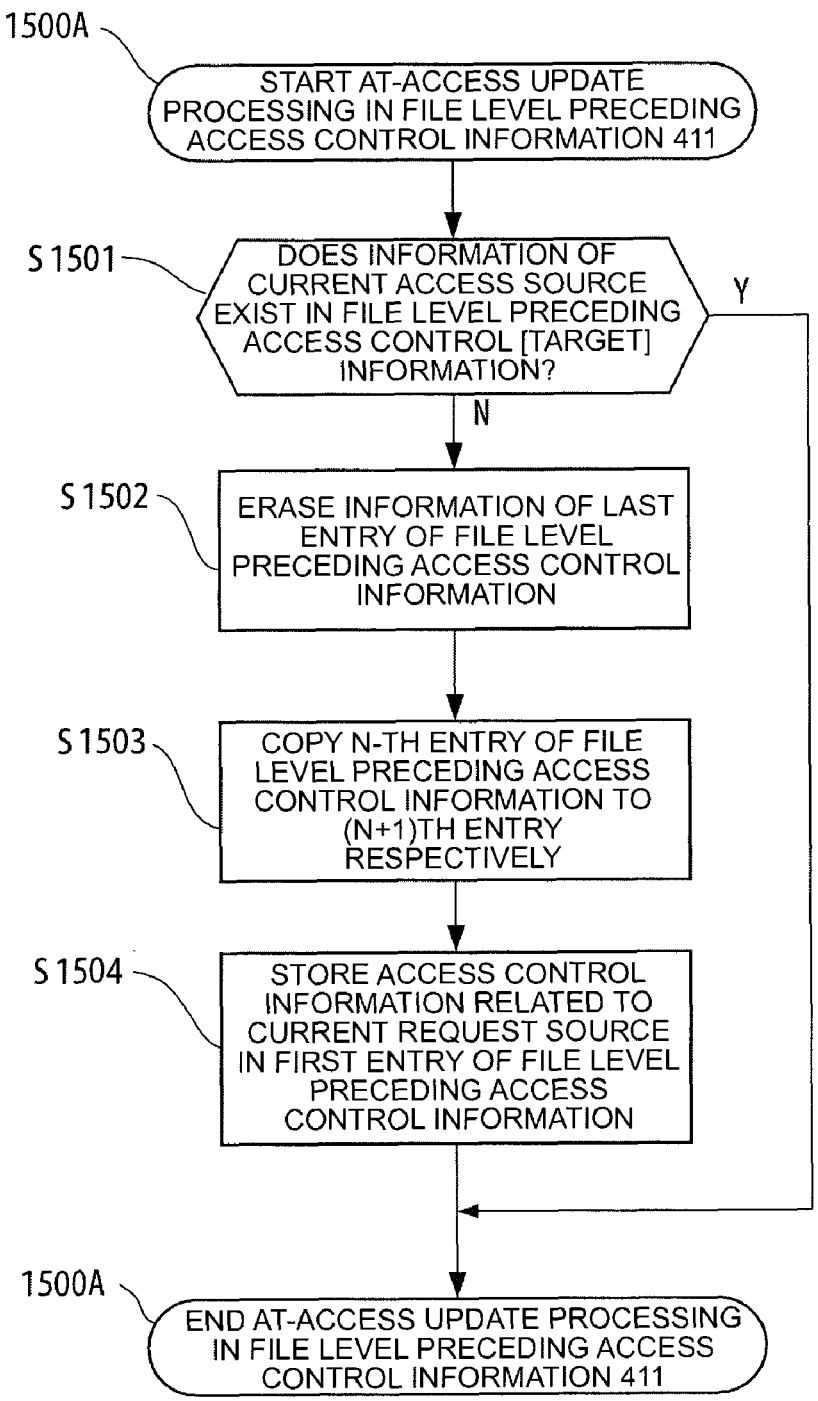
FIG. 15 is a first flowchart of the at-access update processing for the file level preceding access control information.

FIG. 15 is a processing flowchart of performing the at-access update in the file level preceding access control in the Least Recently Used (LRU) method.

The preceding access control compliant server program, at S1501, determines whether the request user identifier which is the identifier of the user currently requiring access to the file exists in the file level preceding access control target information 422 of the file level preceding access control information 411 or not. If the request user identifier exists, the program completes the processing and, if the identifier does not exist, shifts the processing to S1502.

Note that if the request user identifier is the N-th entry, which is not the first entry, of the file level preceding access control target information 422, the program may shift the entry to be the first entry and shift the existing first to (N−1)th entries to be the second to the N-th entries. Note that, in the foregoing case, the entry 4230 of the preceding access right information 423 corresponding to the shifted entry is also shifted.

At S1502, the preceding access control compliant server program erases the information of the last entry of the file level preceding access control information 411. The last entry is the entry with the longest elapsed time since last performing the access control processing using the entry.

Next, at S1503, the preceding access control compliant server program copies the N-th entry of the file level preceding access control information to the (N+1)th entry respectively. If the number of entries is one, this processing is skipped.

Next, at S1504, the preceding access control compliant server program stores the access control information related to the request user identifier as the first entry of the file level preceding access control information. This is where the processing of performing the at-access update in the file level preceding access control by the LRU method is completed.

Figure 16:
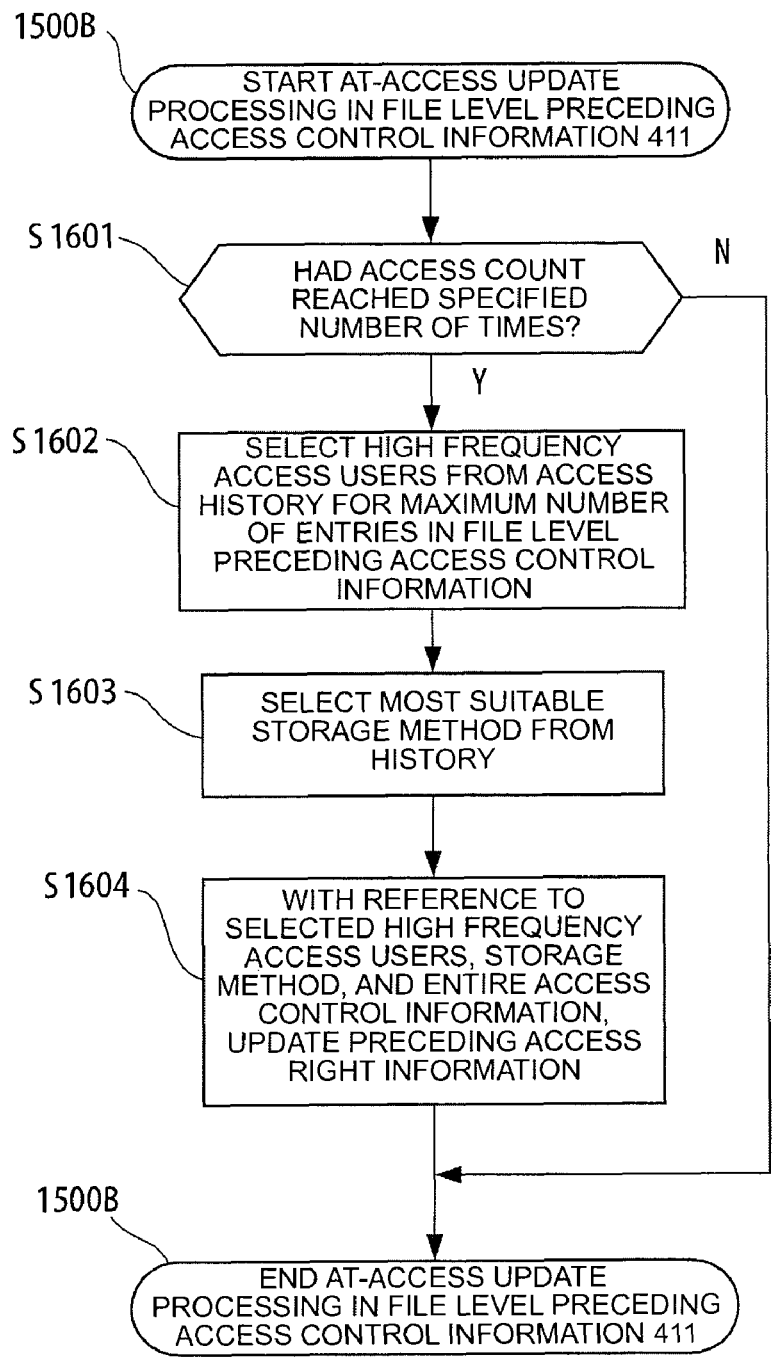
FIG. 16 is a second flowchart of the at-access update processing for the file level preceding access control information.

FIG. 16 is a processing flowchart of the method of performing the above-mentioned at-access update in the file level preceding access control in accordance with the access history. This processing is performed by the preceding access control compliant file service function 301.

The preceding access control compliant server program, at S1601, determines whether the number of times of accesses to the file has reached the specified number of times (e.g. 10000 times) or not. This is because reviewing whether to perform the update processing for each access or not is not efficient. If the specified number of times is not reached, the program completes the processing or, if the specified number of times is reached, the program shifts the processing to S1602.

At S1602, the preceding access control compliant server program, with reference to the access history information 415, selects the identifiers of the user accessing the file highly frequently (highly frequently accessing user) for the maximum number of entries in the file level preceding access control information.

The preceding access control compliant server program, at S1603, selects the most suitable storage format from the access history information 415. For example, if the setting patterns of the preceding access control information are biased, the "Storage Method S" is selected while, if the types of the performed access processing are biased, the "Storage Method U" or the "Storage Method P" is selected.

At S1604, with reference to the selected highly frequent users, the selected storage format, and the entire access control information, the preceding access control compliant server program updates the preceding access right information 423.

This is where the processing of performing the at-access update in the file level preceding access control in accordance with the access history is completed.

Figure 17:
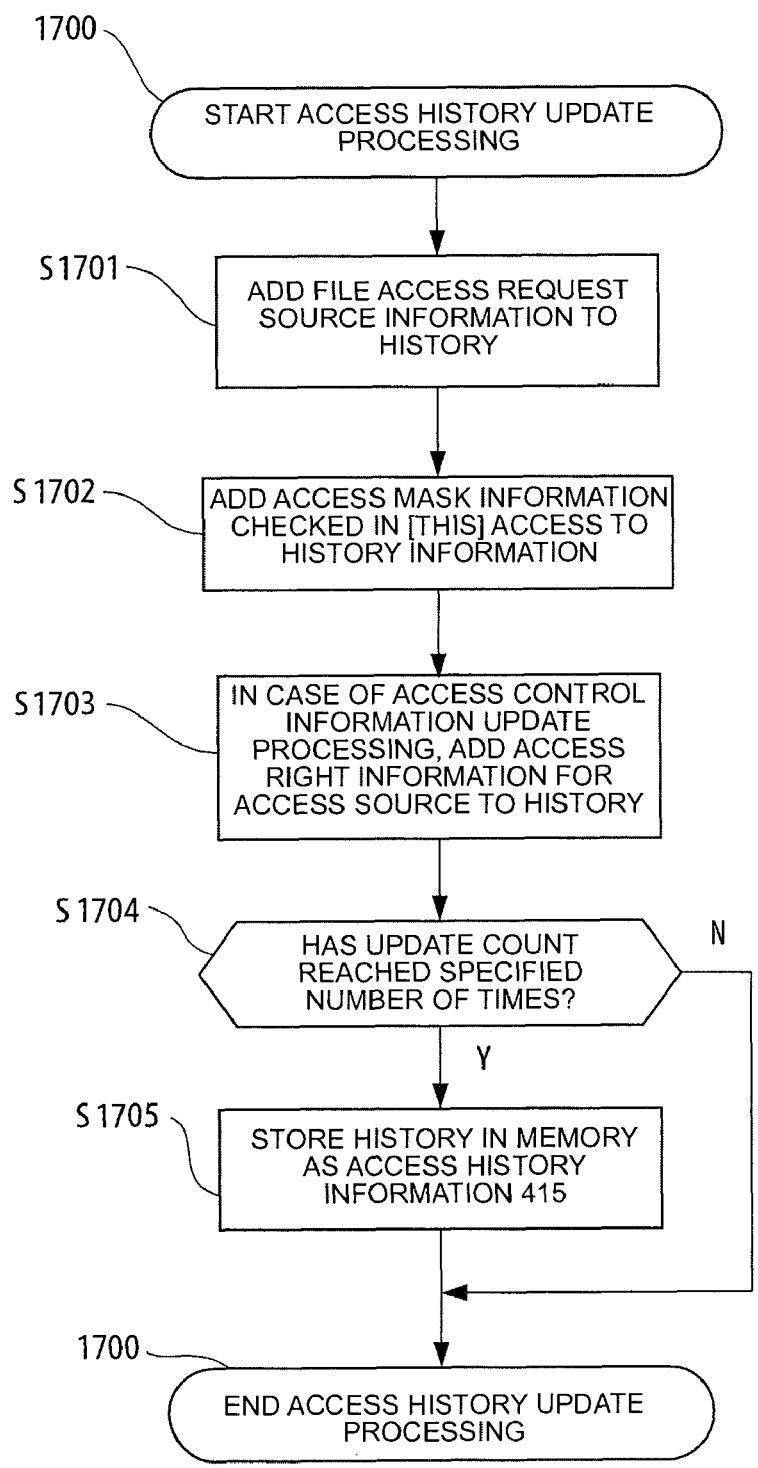
FIG. 17 is a flowchart of the access history update processing.

FIG. 17 is a processing flowchart of the access history update processing 1700. This processing is performed by the preceding access control compliant file service function 301.

The preceding access control compliant server program, at S1701, adds the user identifier of the access request specifying the corresponding file to the access history information 415 which is cached to the memory 204.

At S1702, the preceding access control compliant server program adds the access mask information checked for the access control in this access to the access history information 415 in the memory. For example, if the access is a READ system call, FILE_READ_DATA is the checked access mask information.

The preceding access control compliant server program, at S1703, if this access is the access control information update processing (FIG. 15, FIG. 16), adds the access right information of which the access source is changed to the access history information in the memory. The access right information is an access mask bit string.

At S1704, the preceding access control compliant server program determines whether the number of times of updating the access history information 415 which is cached to the memory 204 has reached the specified number of times (e.g. 100 times) or not. If the specified number of times is reached, the program shifts the processing to S1705. If the specified number of times is not reached, the program completes the processing. This is because writing to the extended attribute for each access is not efficient.

Then, the preceding access control compliant server program, at S1705, stores the access history information cached to the memory 204 as the access history information 415 of the file system.

This is where the access history update processing is completed.

Next, the regular update processing in the file level preceding access control information is described below. Though, in the above-mentioned embodiment, the preceding access control information is reviewed when the file access processing is performed, the embodiment described below performs the review at a regular time interval. This processing is performed by the preceding access control information regular update function 307. Note that both of these types of review may be performed simultaneously while only either one of the same may also be performed.

Figure 18:
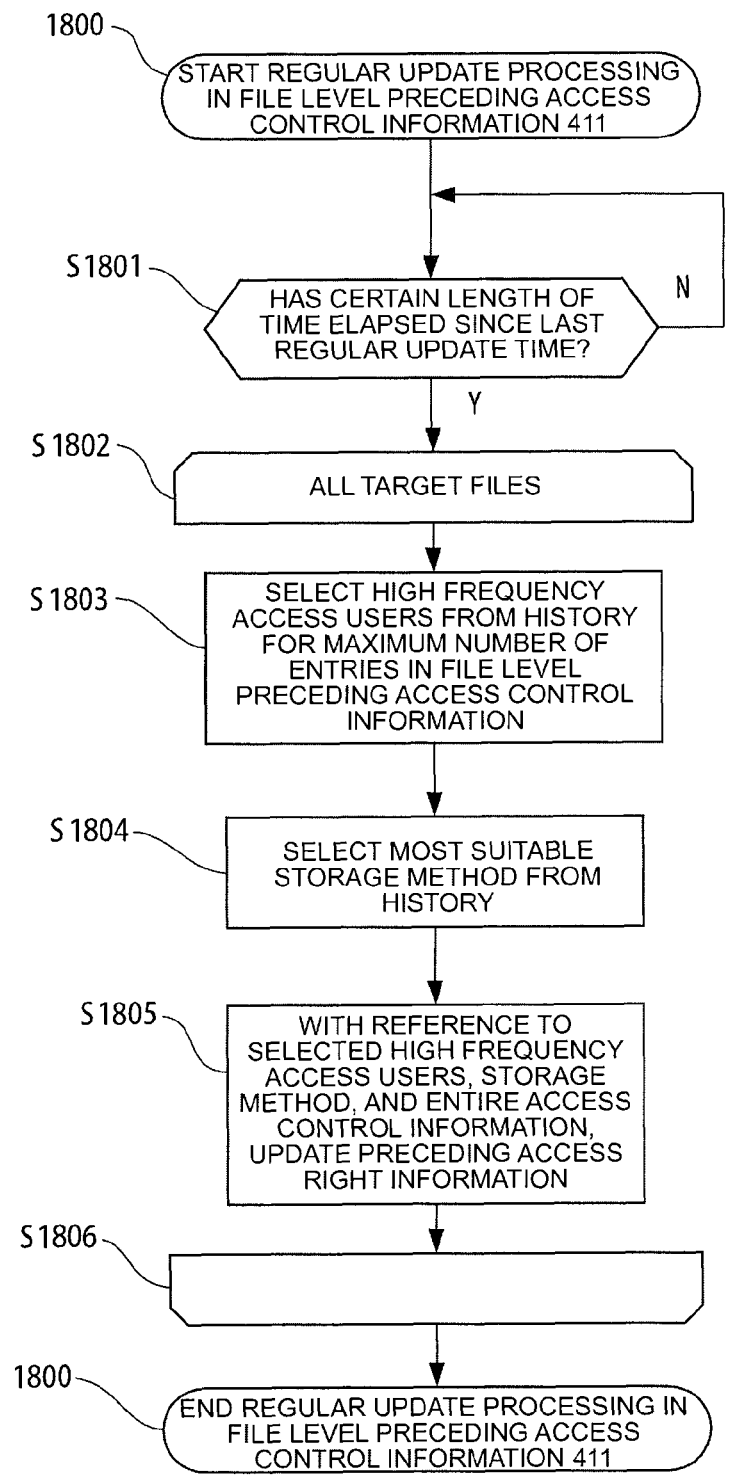
FIG. 18 is a flowchart of the regular update processing for the file level preceding access control information.

FIG. 18 is a flowchart of the regular update processing in the file level preceding access control information. The preceding access control compliant server program, at S1801, determines whether a certain length of time (e.g. 1 month) has elapsed since the last regular update or not. If that length of time has not elapsed, the program waits until the time] elapses or, if [the time has elapsed, continues the processing.

The program performs the processing steps from S1803 to S1805 for all the target files. At S1803, with reference to the access history information 415, the program selects the most highly frequently accessing users for the maximum number of entries in the file level preceding access control information.

The preceding access control compliant server program, at S1804, selects the most suitable storage format from the access history information 415. For example, if the setting patterns of the access control information are biased, the "Storage Method S" is selected while, if the types of the performed access processing are biased, the "Storage Method U" or the "Storage Method P" is selected. At S1805, with reference to the selected highly frequently accessing users, the selected storage format, and the entire access control information, the program updates the preceding access right information 423. This is where the regular update processing in the file level preceding access control information is completed.

Figure 19:
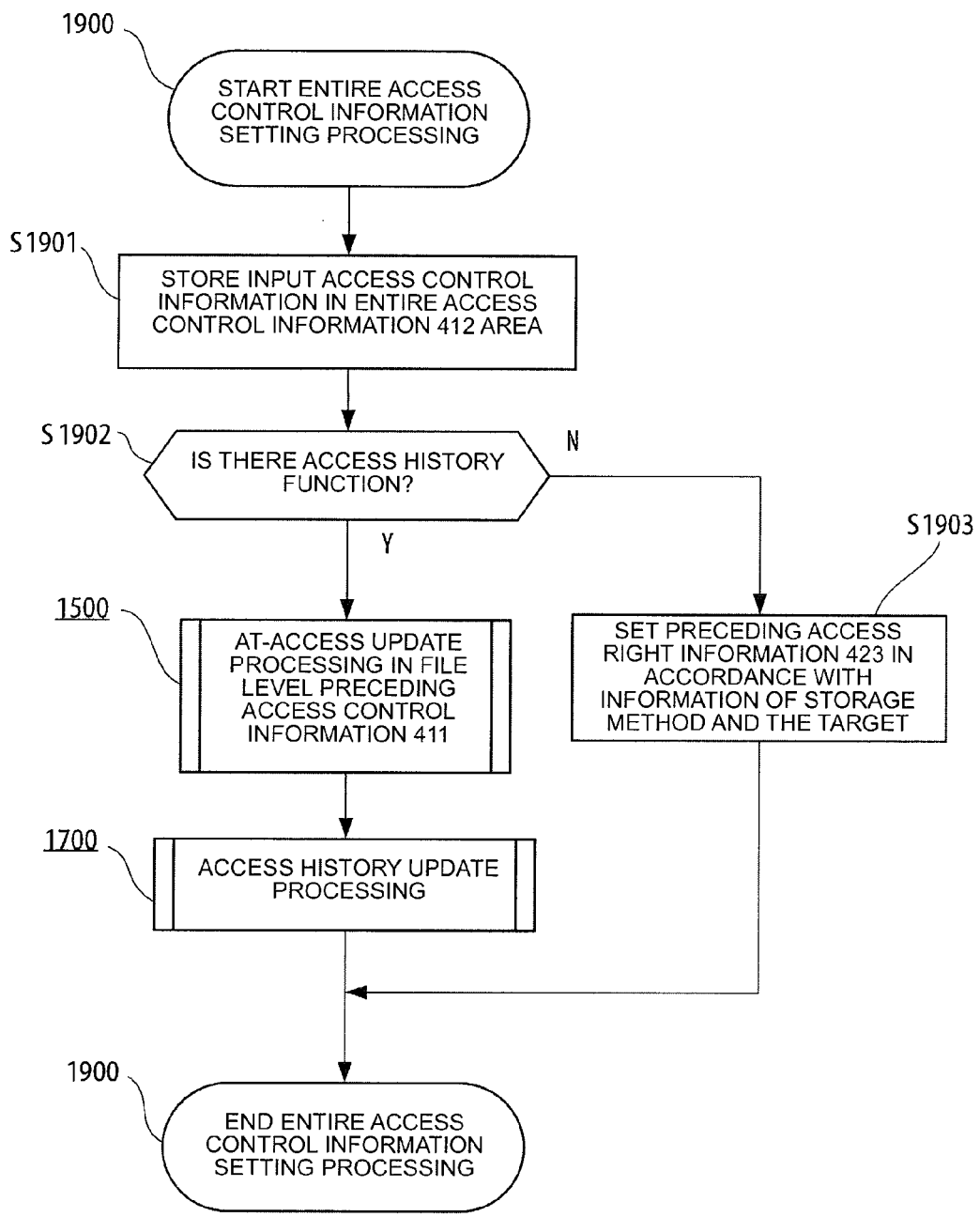
FIG. 19 is a flowchart of the setting processing for entire access control information.

Next, the setting processing of the entire access control information is described below. This processing is performed by the preceding access control compliant access control information setting function 302. FIG. 19 is a flowchart of the setting processing for entire access control information.

The preceding access control compliant server program, at S1901, stores the input access control information in the entire access control information 412.

At S1902, the preceding access control compliant server program determines whether the access history function described in FIG. 17 exists or not. If the access history function exists, the preceding access control compliant server program performs the file level preceding access control information at-access update processing 1500, and then, performs the access history update processing 1700. If the access history function does not exist, the preceding access control compliant server program shifts the processing to S1903.

At S1903, the preceding access control compliant server program updates the preceding access right information 423. This update is performed in accordance with the information of the storage format and the target set for the preceding access right information. This is where the setting processing of the entire access control information is completed.

According to this invention, even if the access control information is of a variable size, the access performance equal to the case where the access control information is of a fixed size can be achieved.

Industrial Applicability

The file access control system in this invention can be embedded in a file server, a file storage, a NAS, a storage system, and a computer system.

REFERENCE SIGN LIST

101: Preceding access control compliant file storage system
102: Network
103: Management terminal
104: Client
310: File system metadata
311: File

The invention claimed is:
1. A storage system, comprising:
a storage device in which a file system is created; and
a file access controller for determining an executability of an access request to a file based on access control information showing whether access to a file stored in the file system is permitted,
wherein the file is configured from a data area, a basic attribute area, and an extended attribute area,
wherein the access control information comprises:
second access control information stored in the extended attribute area of the file as a variable length area,
the second access control information including a plurality of information of access rights showing a type of a plurality of access requests to be permitted or rejected for each user or group that executes the access request to the file; and
first access control information stored in the basic attribute area of the file as a fixed length area,
the first access control information being at least a partial information of the access right included in the second access control information, and
the first access control information showing one or more types of the access requests to be permitted or rejected for the user or the group,
wherein the file access controller is configured to:
(A) execute, upon receiving the access request to the file, a first determination processing of determining whether access to the file is permitted by using the first access control information stored in the basic attribute area of the file, wherein the first access control information includes said information converted from the information of the access right included in the second access control information; and
(B) execute a second determination processing of determining whether the access to the file is permitted based on the second access control information stored in the extended attribute area of the file when the storage system cannot determine via the first determining processing whether access to the file is permitted.

2. The storage system according to claim 1,
wherein the file access controller is configured to acquire the information of the access right by converting the information included in the first access control information, and is configured to execute the first determination processing based on the information of the acquired access right.

3. The storage system according to claim 1,
further comprising a storage format for the information of the first access control information, wherein the storage format comprises:
(1) a first format which uses, among the information of the access rights, information of the one or more types of the access requests that is frequently used in access control as the information;
(2) a second format which sets, among the information of the plurality of the access rights, a plurality of patterns configured from the partial information of the access right, and uses information corresponding to each pattern as the information; and
(3) a third format of applying the first format to a part of an amount of information configuring the information, and applying the second format to remainder of the amount of information.

4. The storage system according to claim 3,
wherein the basic attribute area of the file comprises:
a first area for storing the first access control information;
a second area for storing information of a user or a group that is subject to the first determination processing based on the first access control information; and
a third area for storing information of the storage format.

5. The storage system according to claim 4,
wherein the file access controller is configured to:
(A1) determine whether a user of the access request to the file is included in the information of the first area;
(A2) perform the first determination processing upon affirming the foregoing determination; and
(A3) perform the second determination processing without referring to the first area based on the first determination processing upon negating the foregoing determination.

6. The storage system according to claim 5,
wherein the file access controller is configured to:
(C) set the storage format and the information of the user or the group that is subject to the first determination processing in the file system; and
(D) upon creating the file, receive a selection input of whether to apply the information that was set in the file system to the file to be created, or whether to apply the storage format and information of the user or group that was set in a parent directory of the file to be created to the file to be created.

7. The storage system according to claim 6,
wherein the file access controller is configured to:
- (E) change the information of the storage format stored in the third area;
- (F) update the first access control information based on the changed storage format, information of the changed user or group, and the second access control information; and
- (G) execute the first determination processing based on the updated first access control information.

8. The storage system according to claim 7,
wherein the file access controller is configured to add information of a predetermined user, who is a user whose access request is currently being processed, to the information of the user or the group that is subject to the first determination processing based on the first access control information, and to add data of the access right concerning the predetermined user to the first access control information.

9. The storage system according to claim 8,
wherein the file access controller is configured to:
- (H) change the information of the storage format and the information of the user or the group that is subject to the first determination processing based on the history of access to the file; and
- (I) update the first access control information based on the information of the changed storage format and target information.

10. The storage system according to claim 9,
wherein the file access controller is configured to update the first access control information upon determining that the number of accesses to the file has reached a specified number of times.

11. The storage system according to claim 10,
wherein the basic attribute area of the file comprises information showing a block address of a user data area storing user data of the file, and
wherein, if the file request is read, the file access controller specifies the block address in the storage device storing the read-target data by referring to the basic attribute area.

12. A file access determination method in which a file access controller determines whether access to a file stored in a file system created in a storage device is permitted based on access control information, comprising the steps of:
- storing second access control information, including a plurality of information of access rights showing a type of a plurality of access requests to be permitted or rejected for each user or group that executes the access request to the file in an extended attribute area of the file as a variable length area;
- creating first access control information wherein the first access control information is at least a partial information of the access right included in the second access control information; and the first access control information is configured to show one or more types of the access requests to be permitted or rejected for the user or the group;
- storing the created first access control information in a basic attribute area of the file as a fixed length area;
- upon receiving the access request to the file, executing first determination processing of determining whether access to the file is permitted by using the first access control information stored in the basic attribute area of the file;
- wherein the first access control information includes said information converted from the information of the access right included in the second access control information;

and
- executing a second determination processing of determining whether the access to the file is permitted based on the second access control information stored in the extended attribute area of the file when the storage system cannot determine via the first determining processing whether access to the file is permitted.

* * * * *